(12) United States Patent
Choi et al.

(10) Patent No.: US 11,190,837 B2
(45) Date of Patent: Nov. 30, 2021

(54) ELECTRONIC APPARATUS AND CONTROLLING METHOD THEREOF

(71) Applicant: SAMSUNG ELECTRONICS CO., LTD., Suwon-si (KR)

(72) Inventors: Jiwoong Choi, Suwon-si (KR); Hyunsoo Choi, Suwon-si (KR); Minsoo Kim, Suwon-si (KR); Sungjin Kim, Suwon-si (KR); Younguk Kim, Suwon-si (KR); Ilkoo Kim, Suwon-si (KR); Hyunhan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/431,886

(22) Filed: Jun. 5, 2019

(65) Prior Publication Data

US 2019/0394525 A1     Dec. 26, 2019

(30) Foreign Application Priority Data

Jun. 25, 2018    (KR) .................. 10-2018-0073000

(51) Int. Cl.
*H04N 21/44* (2011.01)
*H04N 21/439* (2011.01)
(Continued)

(52) U.S. Cl.
CPC ....... *H04N 21/44222* (2013.01); *H04N 5/147* (2013.01); *H04N 21/23418* (2013.01);
(Continued)

(58) Field of Classification Search
CPC ......... H04N 21/44008; H04N 21/4394; H04N 21/23418; H04N 21/4396;
(Continued)

(56) References Cited

U.S. PATENT DOCUMENTS 6,636,609 B1 * 10/2003 Ha .................. H03G 3/3089
381/104
7,266,287 B2    9/2007 Zhang
(Continued)

FOREIGN PATENT DOCUMENTS

CN    103002328 A    3/2013
EP      1653381 A2   5/2006
(Continued)

OTHER PUBLICATIONS

Search Report dated Jul. 10, 2019, issued by the International Searching Authority in International Application No. PCT/KR2019/003304 (PCT/ISA/210).
(Continued)

*Primary Examiner* — Pinkal R Chokshi
(74) *Attorney, Agent, or Firm* — Sughrue Mion, PLLC

(57) ABSTRACT

An electronic apparatus is provided. The electronic apparatus includes a memory configured to store computer executable instructions, an interface, a display, and a processor configured to, by executing the computer executable instructions control the display to display an image corresponding to a broadcasting content input through the interface, based on a mute interval being detected by analyzing an input signal, compare a signal before the mute interval with a signal after the mute interval and identify whether the signals before and after the mute interval are continuous, and identify an occurrence of a channel change event in which the broadcasting content is changed to another broadcasting content based on the identification.

20 Claims, 16 Drawing Sheets

(51) Int. Cl.
*H04N 21/234* (2011.01)
*H04N 21/442* (2011.01)
*H04N 5/14* (2006.01)
*H04N 21/434* (2011.01)

(52) U.S. Cl.
CPC ..... *H04N 21/4394* (2013.01); *H04N 21/4396* (2013.01); *H04N 21/44008* (2013.01); *H04N 21/4345* (2013.01)

(58) Field of Classification Search
CPC ......... H04N 21/44222; H04N 21/4345; H04N 21/4383; H04N 21/4384
See application file for complete search history.

(56) References Cited

U.S. PATENT DOCUMENTS

| | | | |
|---|---|---|---|
| 7,765,564 | B2 | 7/2010 | Deng |
| 7,903,098 | B2* | 3/2011 | Tokimoto ........... H04N 21/4384 345/204 |
| 7,975,285 | B2* | 7/2011 | Takegoshi ........ H04N 21/44222 725/151 |
| 8,019,162 | B2 | 9/2011 | Zhang et al. |
| 8,819,717 | B2 | 8/2014 | Deng |
| 8,843,990 | B1 | 9/2014 | Haberman et al. |
| 8,856,817 | B2 | 10/2014 | Sinha et al. |
| 9,146,990 | B2 | 9/2015 | Scherf et al. |
| 9,301,008 | B2 | 3/2016 | Park et al. |
| 9,319,740 | B2 | 4/2016 | Sinha et al. |
| 9,473,820 | B2 | 10/2016 | Mallinson |
| 9,495,451 | B2 | 11/2016 | Harron |
| 9,565,456 | B2* | 2/2017 | Helferty ............. H04N 21/4542 |
| 9,576,473 | B2 | 2/2017 | Navin et al. |
| 10,045,073 | B2 | 8/2018 | Seo et al. |
| 10,219,011 | B2 | 2/2019 | Jung et al. |
| 2005/0154952 | A1* | 7/2005 | Kawada ................... H04N 5/04 714/735 |
| 2007/0061833 | A1* | 3/2007 | Deng ................. H04N 21/4394 725/18 |
| 2007/0209055 | A1 | 9/2007 | Koga et al. |
| 2007/0212030 | A1 | 9/2007 | Koga et al. |
| 2008/0082995 | A1* | 4/2008 | Tanaka ................... H04H 60/66 725/18 |
| 2008/0127253 | A1* | 5/2008 | Zhang ................. H04N 21/478 725/35 |
| 2009/0066845 | A1 | 3/2009 | Okuda |
| 2010/0053452 | A1* | 3/2010 | Abe ....................... H04N 5/147 348/700 |
| 2010/0123823 | A1* | 5/2010 | Kim ..................... H04N 21/485 348/448 |
| 2011/0275311 | A1 | 11/2011 | Buehler et al. |
| 2011/0276882 | A1* | 11/2011 | Buehler ................. H04H 60/31 715/727 |
| 2012/0117584 | A1 | 5/2012 | Gordon |
| 2012/0324499 | A1* | 12/2012 | Deng ..................... H04H 60/33 725/18 |
| 2013/0218735 | A1 | 8/2013 | Murray |
| 2013/0331971 | A1* | 12/2013 | Bida ..................... H04N 21/233 700/94 |
| 2014/0082646 | A1 | 3/2014 | Sandland |
| 2014/0101683 | A1 | 4/2014 | Arshavski et al. |
| 2014/0181853 | A1* | 6/2014 | Dureau .................... H04N 5/50 725/19 |
| 2014/0230002 | A1* | 8/2014 | Kitazato ............ H04N 21/4122 725/109 |
| 2014/0282668 | A1 | 9/2014 | Gava et al. |
| 2015/0089535 | A1 | 3/2015 | Moon et al. |
| 2015/0334459 | A1 | 11/2015 | Oh et al. |
| 2016/0073047 | A1* | 3/2016 | Yabu ................. H04N 21/4383 348/565 |
| 2016/0112768 | A1 | 4/2016 | Kim et al. |
| 2016/0127759 | A1 | 5/2016 | Jung et al. |
| 2016/0286263 | A1 | 9/2016 | Jung et al. |
| 2016/0316261 | A1 | 10/2016 | Koshevoy |
| 2016/0316262 | A1 | 10/2016 | Chen |
| 2017/0171609 | A1 | 6/2017 | Koh |
| 2017/0201793 | A1 | 7/2017 | Pereira et al. |
| 2017/0208353 | A1 | 7/2017 | Kim et al. |
| 2017/0238065 | A1 | 8/2017 | Jang et al. |
| 2017/0295400 | A1 | 10/2017 | Jang et al. |
| 2018/0035149 | A1 | 2/2018 | Choi et al. |
| 2019/0050666 | A1 | 2/2019 | Kim et al. |
| 2019/0138911 | A1 | 5/2019 | Kadochnikov et al. |
| 2020/0026797 | A1 | 1/2020 | Weinstein |
| 2020/0133643 | A1 | 4/2020 | Hou |
| 2020/0310952 | A1 | 10/2020 | Shani et al. |

FOREIGN PATENT DOCUMENTS

| | | |
|---|---|---|
| EP | 2608107 A2 | 6/2013 |
| EP | 2 763 427 A1 | 8/2014 |
| EP | 2916554 A1 | 9/2015 |
| EP | 3 334 172 A1 | 11/2017 |
| EP | 3340639 A1 | 6/2018 |
| EP | 3 399 765 A1 | 11/2018 |
| JP | 4967998 B2 | 7/2012 |
| JP | 5277582 B2 | 8/2013 |
| JP | 2015-162865 A | 9/2015 |
| KR | 10-1237229 B1 | 2/2013 |
| KR | 10-2013-0124911 A | 11/2013 |
| KR | 10-1377849 B1 | 3/2014 |
| KR | 10-2015-0030185 A | 3/2015 |
| KR | 10-2016-0053549 A | 5/2016 |
| KR | 10-1644956 B1 | 8/2016 |
| KR | 10-2016-0115264 A | 10/2016 |
| KR | 10-1747776 B1 | 6/2017 |
| KR | 10-2017-0101076 A | 9/2017 |
| KR | 10-2018-0014657 A | 2/2018 |
| KR | 10-1873364 B1 | 8/2018 |
| WO | 2005/032145 A1 | 4/2005 |
| WO | 2014/082353 A1 | 6/2014 |
| WO | 2017/146454 A1 | 8/2017 |

OTHER PUBLICATIONS

Written Opinion dated Jul. 10, 2019, issued by the International Searching Authority in International Application No. PCT/KR2019/003304 (PCT/ISA/237).
Search Report dated Sep. 19, 2019, issued by the International Searching Authority in International Application No. PCT/KR2019/006495 (PCT/ISA/210).
Written Opinion dated Sep. 19, 2019, issued by the International Searching Authority in International Application No. PCT/KR2019/006495 (PCT/ISA/237).
Montagnuolo, M., et al., "Automatic Genre Classification of TV Programmes Using Gaussian Mixture Models and Neural Networks", Database and Expert Systems Applications, 18th International Workshop on Database and Expert Systems Applications, Sep. 1, 2007, pp. 99-103, XP055665042.
Communication dated Feb. 12, 2020 from the European Patent Office in application No. 19210566.6.
EP Search Report dated Sep. 29, 2020 by the European Patent Office in counterpart European Patent Application No. 19806480.0.
Office Action dated Oct. 2, 2020 by the United States Patent and Trademark Office in counterpart U.S. Appl. No. 16/690,544.
Communication dated Feb. 4, 2021 by the European Patent Office in corresponding European Application No. 19827383.1.
Communication dated May 5, 2021 by the United States Patent and Trademark Office in counterpart U.S. Appl. No. 16/690,544.
Communication dated May 25, 2021 by the European Patent Office in counterpart European Patent Application No. 19210566.6.
Communication dated Jul. 9, 2021 by the European Patent Office in counterpart European Patent Application No. 19210566.6.
Communication dated Jul. 13, 2021 by the European Patent Office in counterpart European Patent Application No. 19210566.6.
Communication dated Aug. 10, 2021 issued by the United States Patent and Trademark Office in counterpart U.S. Appl. No. 16/690,544.

(56) References Cited

OTHER PUBLICATIONS

Communication dated Sep. 29, 2021, issued by the United States Patent and Trademark Office in U.S. Appl. No. 16/690,544.

* cited by examiner

ELECTRONIC APPARATUS AND CONTROLLING METHOD THEREOF

CROSS-REFERENCE TO RELATED APPLICATIONS

This application claims priority from Korean Patent Application No. 10-2018-0073000, filed on Jun. 25, 2018, in the Korean Intellectual Property Office, the disclosure of which is incorporated herein by reference in its entirety.

BACKGROUND

1. Field

The disclosure relates to an electronic apparatus and a controlling method thereof, and more particularly, to an electronic apparatus for detecting a channel change event accurately and efficiently in diverse situations and a controlling method thereof.

2. Description of Related Art

As user's needs become increasingly diverse, the sources of broadcasting contents or multimedia contents have changed from a public TV based single source to a variety of sources such as cable, Internet Protocol TV (IPTV), video on demand (VOD), etc.

Recently, there has been a demand for improving the contents and advertisements provided to a user. Therefore, it is necessary to understand user's preference, particularly, which type of program a user watches and when the user watches the program. Considering that a channel is a basic unit for content recognition, a channel change event may be important for a program rating survey, a viewing pattern survey, etc.

There has been a method for sensing a channel change by sensing an image change. However, according to such a conventional method, it is inevitable to continuously analyze every signal image frame, the amount of CPU and memory usage may be increased, which is inefficient, and there is a problem that it is difficult to identify whether a channel is changed or an image is just stopped depending on the situation.

SUMMARY

An aspect of the disclosure relates to providing an electronic apparatus capable of detecting a channel change event accurately and efficiently in various situations and a controlling method thereof.

Another aspect of the disclosure relates to providing an electronic apparatus capable of identifying a changed channel accurately and efficiently in various situations and a controlling method thereof.

According to an embodiment, there is provided an electronic apparatus, including a memory configured to store computer executable instructions, an interface, a display, and a processor configured to, by executing the computer executable instructions control the display to display an image corresponding to a broadcasting content input through the interface, based on a mute interval being detected by analyzing an input signal, compare a signal before the mute interval with a signal after the mute interval and identify whether the signals before and after the mute interval are continuous, and identify an occurrence of a channel change event in which the broadcasting content is changed to another broadcasting content based on the identification. The signal before the mute interval may include an audio signal, and the signal after the mute interval may include an audio signal.

The processor may be further configured to perform an image capturing operation from a beginning of the mute interval, and, based on the occurrence of the channel change event being identified, analyze an image captured by the image capturing operation and obtain information on a changed channel.

The processor may be further configured to identify a channel change message from the image captured by the image capturing operation, and obtain the information on the changed channel from the channel change message.

The processor may be further configured to acquire texts included in the channel change message through optical character recognition (OCR) or scene text recognition (STR), and obtain the information on the changed channel based on the acquired texts.

The processor may be further configured to identify the occurrence of the channel change event based on the audio signals before and after the mute interval being identified to be discontinuous and a channel change message being included in the image captured by the image capturing operation.

The processor may be further configured to terminate the image capturing operation based on the audio signals before and after the mute interval being identified to be continuous.

The processor may be further configured to obtain viewing patent information based on the information on the changed channel and electronic program guide (EPG) metadata.

The processor may be further configured to identify the occurrence of the channel change event based on a difference between a frequency pattern of the audio signal before the mute interval and a frequency pattern of the audio signal after the mute interval being greater than a preset threshold value.

The processor may be further configured to identify the occurrence of the channel change event based on a difference between a phase of the audio signal before the mute interval and a phase of the audio signal after the mute interval being greater than a preset threshold value.

The processor may be further configured to, based on the audio signals before and after the mute interval being identified to be discontinuous, compare first fingerprint obtained from an image signal before the mute interval with second fingerprint obtained from an image signal after the mute interval, and based on images before and after the mute interval being identified to be discontinuous according to comparison between the first fingerprint and the second fingerprint, identify the occurrence of the channel change event.

According to an embodiment, there is provided a method for controlling an electronic apparatus, the method including displaying an image corresponding to a broadcasting content input from an external source, based on a mute interval being detected by analyzing an input signal, comparing a signal before the mute interval with a signal after the mute interval, and identifying whether the signals before and after the mute interval are continuous, and identifying an occurrence of a channel change event in which the broadcasting content is changed to another broadcasting content based on the identification. The signal before the mute interval may include an audio signal, and the signal after the mute interval may include an audio signal.

The method may further include performing an image capturing operation from a beginning of the mute interval, and based on the occurrence of the channel change event being identified, analyzing an image captured by the image capturing operation and obtaining information on a changed channel.

The obtaining of the information on the changed channel may include identifying a channel change message from the image captured by the image capturing operation, and obtaining the information on the changed channel from the channel change message.

The obtaining of the information on the changed channel may include acquiring texts included in the channel change message through optical character recognition (OCR) and scene text recognition (STR), and obtaining the information on the changed channel based on the acquired texts.

The identifying of the occurrence of the channel change event may include identifying the occurrence of the channel change event based on the audio signals before and after the mute interval being identified to be discontinuous, and a channel change message being included in the image captured by the image capturing operation.

The method may further include terminating the image capturing operation based on the audio signals before and after the mute interval being identified to be continuous.

The method may further include obtaining viewing pattern information based on the information on the changed channel and electronic program guide (EPG) metadata.

The identifying of the occurrence of the channel change event may include identifying the occurrence of the channel change event based on a difference between a frequency pattern of the audio signal before the mute interval and a frequency pattern of the audio signal after the mute interval being greater than a preset threshold value.

The identifying of the occurrence of the channel change event may include identifying the occurrence of the channel change event based on a difference between a phase of the audio signal before the mute interval and a phase of the audio signal after the mute interval being greater than a preset threshold value.

The identifying of the occurrence of the channel change event may include, based on the audio signals before and after the mute interval being identified to be discontinuous, comparing first fingerprint obtained from an image signal before the mute interval with second fingerprint obtained from an image signal after the mute interval, and, based on images before and after the mute interval being identified to be discontinuous according to comparison between the first fingerprint and the second fingerprint, identifying the occurrence of the channel change event.

DETAILED DESCRIPTION

Figure 1:
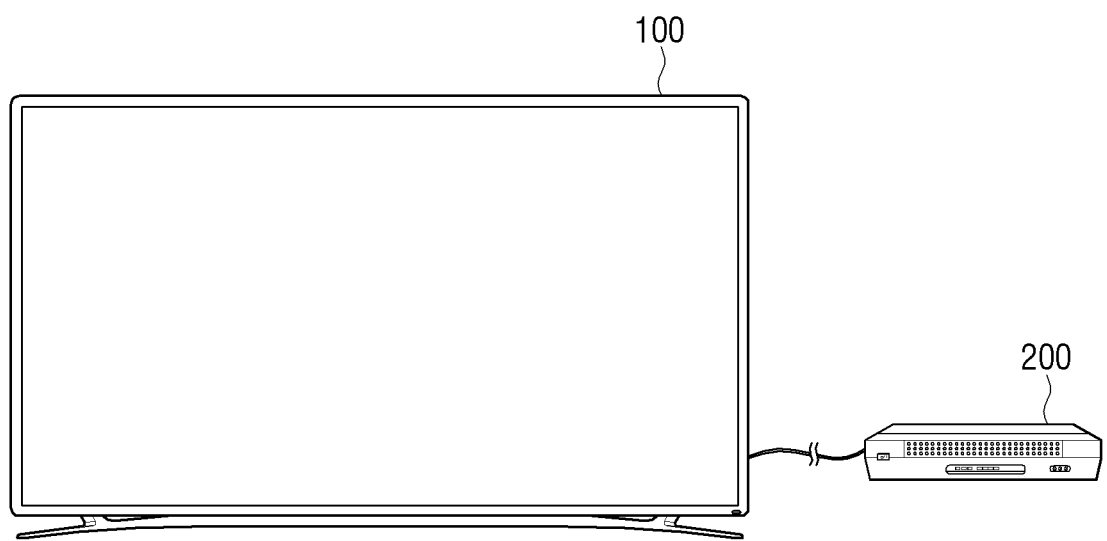
FIG. 1 is a view to explain an electronic apparatus according to an embodiment of the disclosure.

Hereinafter, various embodiments of the disclosure will be described with reference to the accompanying drawings. It is to be understood that the disclosure herein is not intended to limit the scope to the described embodiments, but includes various modifications, equivalents, and/or alternatives of the embodiments. In the description of the drawings, like reference numerals refer to like elements throughout the description of drawings.

According to the present disclosure, the expressions "include," "comprise," "including," and "comprising" indicate that one or more components, steps, operations, and elements exist or are added, and do not exclude the presence of additional features.

In the present disclosure, the expressions "A or B," "at least one of A and/or B," or "one or more of A and/or B," and the like include all possible combinations of the listed items. For example, "A or B," "at least one of A and B," or "at least one of A or B" refers to (1) includes at least one A, (2) includes at least one B or (3) includes at least one A, or at least one B.

Terms such as "first" and "second" may be used to modify various elements regardless of order and/or importance. Those terms are only used for the purpose of differentiating a component from other components. For example, the first user equipment and the second user equipment may represent different user equipment, regardless of order or importance. For example, without departing from the scope of the claims described in this disclosure, the first component may be referred to as a second component, and similarly, the second component may also be referred to as the first component.

In an example embodiment, 'a module', 'a unit', or 'a part' may perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

When an element (e.g., a first constituent element) is referred to as being "operatively or communicatively coupled to" or "connected to" another element (e.g., a second constituent element), it should be understood that each constituent element is directly connected or indirectly connected via another constituent element (e.g., a third constituent element). However, when an element (e.g., a first constituent element) is referred to as being "directly coupled to" or "directly connected to" another element (e.g., a second constituent element), it should be understood that there is no other constituent element (e.g., a third constituent element) interposed therebetween.

The expression "configured to" as used in the present disclosure can refer to, for example, "suitable for," "having the capacity to," "designed to," "adapted to," "made to," or "capable of" depending on the situation. The term "configured to (or set to)" may not necessarily mean "specifically designed to" in hardware. Instead, in some circumstances, the expression "a device configured to" may mean that the device "is able to~" with other devices or components. For example, "a sub-processor configured to (or set to) execute A, B, and C" may be implemented as a processor dedicated to performing the operation (e.g., an embedded processor), or a generic-purpose processor (e.g., a central processor unit (CPU) or an application processor) that can perform the corresponding operations.

The terminology used herein is for the purpose of describing particular embodiments and is not intended to be limiting the scope of other example embodiments. As used herein, the singular forms are used for convenience of explanation, but are intended to include the plural forms as well, unless the context clearly indicates otherwise. In addition, terms used in this specification may have the same meaning as commonly understood by those skilled in the art. General predefined terms used herein may be interpreted as having the same or similar meaning as the contextual meanings of the related art, and unless expressly defined herein, the terms are not to be construed as an ideal or overly formal sense. In some cases, the terms defined herein may not be construed to exclude embodiments of the disclosure.

An electronic apparatus according to various embodiments of the disclosure may be a smartphone, a tablet personal computer (a table PC), a mobile phone, a video phone, an e-book reader, a laptop personal computer (a laptop PC), a netbook computer, a personal digital assistant (PDA), a portable multimedia player (PMP), an MP3 player, a mobile medical device, a camera, internet of things or a wearable device, or they may be part of them. A wearable device may be an accessory type device such as a watch, a ring, a bracelet, a bracelet, a necklace, a pair of glasses, a contact lens or a head-mounted-device (HMD), a fabric or a garment-all-in-one type (e.g., electronic outfit), a body attachment type (e.g., a skin pad or a tattoo), or a bio-implantable circuit.

In some embodiments, examples of the electronic apparatus may be home appliances. The home appliances may include, at least one of, for example, a television, a digital video disk (DVD) player, an audio, a refrigerator, an air conditioner, a vacuum cleaner, an oven, a microwave oven, a washing machine, a set-top box, a home automation control panel, a security control panel, a TV box (e.g., Samsung HomeSync™, Apple TV™, or Google TV™), a game console (e.g., Xbox™, and PlayStation™), an electronic dictionary, an electronic key, a camcorder, or an electronic frame.

In another embodiment, the electronic apparatus may be any of a variety of medical devices (e.g., various portable medical measurement devices such as a blood glucose meter, a heart rate meter, a blood pressure meter or a body temperature meter), a magnetic resonance angiography (MRA), a magnetic resonance imaging (MRI), a computed tomography (CT), a camera, an ultrasonic device, a navigation device, a global navigation satellite system (GNSS), an event data recorder (EDR), a flight data recorder (FDR), an automobile infotainment device (e.g., navigation devices, gyro compasses, etc.), avionics, security devices, head units for vehicles, industrial or home robots, ATMs (automatic teller's machine) of financial institutions, point of sale (POS) of a store, or internet of things such as a light bulb, various sensors, an electric or gas meter, a sprinkler device, a fire alarm, a thermostat, a street lamp, a toaster, an exercise device, a hot water tank, a heater, boiler, etc.

According to some embodiments, the electronic device may be a piece of furniture or a part of a building/structure, an electronic board, an electronic signature receiving device, a projector, or various measurement devices (e.g., water, electricity, gas, or radio wave measuring instruments, etc.). In various embodiments, the electronic device may be a combination of one or more of the various devices described above. The electronic device according to some embodiments may be a flexible electronic device. Further, the electronic device according to the embodiment of the present disclosure is not limited to the above-described devices, and may include technological advancement.

In this disclosure, the term "content" may include video, audio, or a combination thereof. The term "content" includes, but is not limited to, broadcasting content (or broadcasting program), live broadcasting content, recorded broadcasting content, advertisement content, digital video recorder (DVR) content, video on demand (VOD) content, VoD/OTT non-linear content, UGC content, or a combination thereof.

FIG. 1 is a view to explain an electronic apparatus according to an embodiment of the disclosure.

The electronic apparatus 100 may be an apparatus capable of displaying images of contents. For example, the electronic apparatus 100 may be a TV as shown in FIG. 1, but is merely an example. The electronic apparatus 100 may be implemented in various apparatuses such as a smart phone, a tablet PC, a desktop PC, a projector, and the like.

The content providing apparatus 200 may provide a content to the electronic apparatus 100. For example, the content providing apparatus 200 may provide a content to the electronic apparatus 100 through a High Definition Multimedia Interface (HDMI), but the disclosure is not limited thereto. The content providing apparatus 200 may provide a content to the electronic apparatus 100 by using various wired/wireless communication methods.

The content providing apparatus 200 may be an over-the-top (OTT) device, a set-top box, a TV box (e.g., Apple TV™ or Google TV™), a digital video disc (DVD) player, a video cassette recorder (VCR), a Blu-ray player, a game machine, a computer, a server, and the like.

The content providing apparatus 200 may select one of a plurality channels according to a user input, and provide a content of the selected channel to the electronic apparatus 100.

The electronic apparatus 100 and the content providing apparatus 200 may be integrally embodied.

Figure 2:
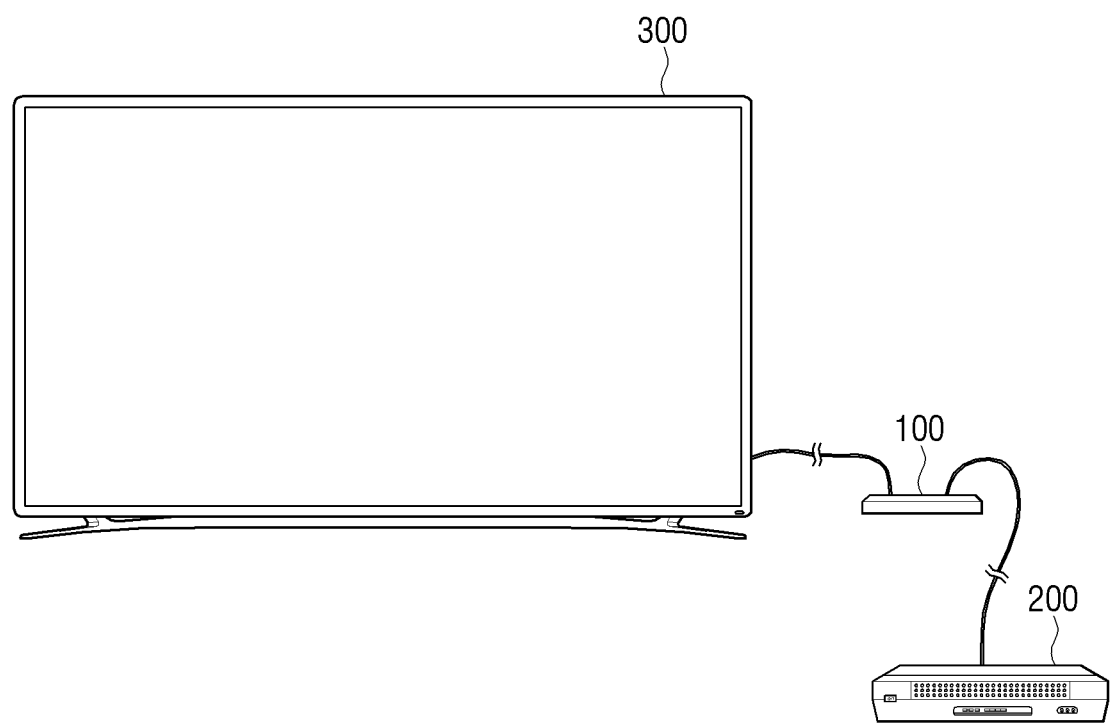
FIG. 2 is a view to explain an electronic apparatus according to another embodiment of the disclosure.

FIG. 2 is a view to explain an electronic apparatus according to another embodiment of the disclosure.

The electronic apparatus 100 may be an apparatus capable of providing an image to an external display device 300 based on content provided from the content providing apparatus 200. The electronic apparatus 100 may be, for example, a TV box (e.g., Samsung HomeSync™, Samsung One Connect Box™, Apple TV™, or Google TV™). The content providing apparatus 200 may be an over-the-top (OTT) device, a set-top box, a DVD (digital video disc) player, a video cassette recorder (VCR), a Blue-ray player, a game machine, a computer, a server, and so on. The electronic apparatus 100 and the content providing apparatus 200 may be implemented as a single apparatus.

The display device 300 may be a device including a display such as a TV, a smartphone, a tablet PC, a desktop PC, a projector, etc.

Referring to FIG. 2, peripheral devices may be connected to the electronic apparatus 100 and then the electronic apparatus 100 may be simply connected to the display device 300 through a single line rather than connecting all the peripheral devices to the display device 300 such as a TV. According to an embodiment, the electronic apparatus 100 may be connected to the display device 300 through for example, an optical cable.

The electronic apparatus 100 according to various embodiments shown in FIG. 1 or FIG. 2 may not only receive contents from the content providing apparatus 200 and provide the contents to a user, but also sense whether a channel change has occurred independently of the content providing apparatus 200. For example, in the case of a set-top box and a TV, when a user controls a set-top box with a remote controller for a set-top box, and changes a channel, the set-box may recognize that a channel has been changed, but a typical TV may not recognize that the channel has been changed in the set-top box and may provide a broadcast program of a particular channel input from the set-top box. However, in the case of a TV embodied as the electronic apparatus 100 according to embodiments of the disclosure, the set-top box may recognize whether a channel has been changed. The electronic apparatus 100 that performs such function will be described in detail below.

Figure 3:
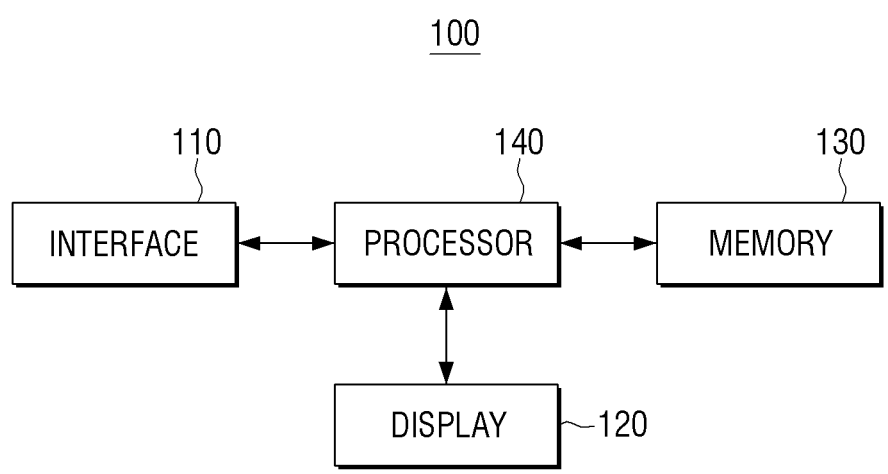
FIG. 3 is a block diagram to explain configuration of an electronic apparatus according to an embodiment of the disclosure.

FIG. 3 is a block diagram to explain configuration of an electronic apparatus according to an embodiment of the disclosure.

Referring to FIG. 3, an electronic apparatus 100 may include an interface 110, a display 120, a memory 130, and a processor 140. According to an embodiment, although not shown, hardware/software configurations that can be obvious to a person skilled in the art could be additionally included in the electronic apparatus 100. In addition, according to an embodiment, some configurations could be omitted. For example, when the electronic apparatus 100 is embodied as an apparatus shown in FIG. 2, the display 120 may be omitted. Instead, an image may be provided to the external display device 300 through the interface 110 or a communicator (not shown).

The interface 110 may be configured to exchange information with other electronic devices in one direction or both directions. The interface 110 may mean a hardware interface comprising a circuitry. For example, the interface 110 may include a high-definition multimedia interface (HDMI) port, a display port, a component input jack, a network port, a cable input port, an antenna input port, a Universal Serial Bus (USB) port, DVI, thunderbolt, and the like, but is not limited thereto.

The display 120 may be configured to display an image, and embodied with a liquid crystal display (LCD) or a cathode-ray tube (CRT), a plasma display panel (PDP), an OLED organic light emitting diodes (OLEDs), and transparent OLEDs (TOLEDs) in some cases. In addition, the display 120 may be implemented as a touch screen capable of sensing a user's touch operation.

The memory 130 may include, for example, internal memory or external memory. The internal memory may be, for example, a volatile memory (e.g., dynamic RAM (DRAM), static RAM (SRAM), or synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash), hard drive, solid state drive (SSD), etc.

The external memory may be a flash drive, for example, a compact flash (CF), a secure digital (SD), a micro secure digital (Micro-SD), a mini secure digital (Mini-SD), an extreme digital (xD), a multi-media card (MMC), a memory stick, or the like.

The memory 130 may be accessed by the processor 140, and data may be read/recorded/revised/deleted/renewed by the processor 140. The memory 130 may store computer executable instructions.

The term memory may include at least one of a memory additionally provided memory apart from the processor 140, ROM (not shown), or RAM (not shown) in the processor 140.

The processor 140 may be configured to control the overall operation of the electronic apparatus 100. For example, the processor 140 may control various hardware or software constituent elements by driving an operation system or an application program. The processor 140 may be a central processing unit (CPU) or a graphics-processing unit (GPU). The processor 140 may be implemented by at least one general processor, a digital signal processor, an application specific integrated circuit (ASIC), a system on chip (SoC), a microcomputer (MICOM), or the like. The processor 140 may perform operations of the electronic apparatus 100 according to various embodiments of the disclosure by executing the computer executable instructions stored in the memory 130.

For example, the processor 140 may identify a channel change event by executing the computer executable instructions stored in the memory 130.

The processor 140 may identify a channel change event by analyzing the feature of a content itself. For example, the processor 140 may identify a channel change event based on video feature information and audio feature information of the content.

According to a channel change, a mute interval may occur in an audio signal. For example, when a channel is changed from a first channel to a second channel, an audio signal may not be output during the change, so that a mute interval may occur. The processor 140 may identify a channel change event by sensing the mute interval. However, the mute interval may occur in the other cases than the case where the channel is changed. For example, a mute interval may occur even when a delay occurs in content providing such as buffering due to a network problem. According to various embodiments of the disclosure, it is possible to identify a channel change event accurately by taking into account not only the occurrence of the mute interval but also other factors.

When a mute interval is detected by analyzing an audio signal input through the interface 110, the processor 140 may compare frame information before the mute interval with frame information after the mute interval. As a result of the comparison, if it is identified that audio signals and/or video signals before and after the mute interval are discontinuous, the processor 140 may identify an occurrence of a channel change event.

The frame information may include at least one of feature information of an audio signal and feature information of a video signal. The feature information of the audio signal may include at least one of amplitude, frequency, phase, or audio fingerprint of audio. The feature information of the video signal may include video fingerprint. The fingerprint may be unique data for video or audio in a part of the content, and may reflect a unique feature of a signal itself. The video fingerprint obtained from the video signal may be information indicating the feature of motion vector, color, etc. of the video signal, and the audio fingerprint obtained from the audio signal may be information indicating frequency, amplitude, etc. of the audio signal.

When a difference between frame information before the mute interval and frame information after the mute interval is greater than a preset (or predetermined) threshold value, the processor 140 may identify that signals are discontinuous and identify that a channel change event occurs.

The processor 140 may identify one or more various feature information to identify whether a channel change event occurs. For example, the processor 140 may confirm frequency patterns before and after the mute interval to identify an occurrence of a channel change event. For another embodiment, the processor 140 may confirm the video fingerprint obtained from image signals before and after the mute interval to identify the occurrence of the channel change event. The processor 140 may confirm frequency patterns and phases of audio signals before and after the mute interval to identify the occurrence of the channel change event. The processor 140 may confirm frequency patterns of audio signals before and after the mute interval and fingerprint obtained from an image signal to identify an occurrence of a channel change event. The processor 140 may identify a frequency pattern of an audio signal, a phase of an audio signal and video fingerprint obtained from a video signal in order to identify an occurrence of a channel change event. Other than the above, various combinations may be possible.

A channel change event may be identified by not only comparing audio signals or video signals before and after the mute interval but also identifying whether there is a channel change message. The processor 140 may perform an image capturing operation when a mute interval begins, and, when audio signals and/or video signals before and after the mute interval are identified as being discontinuous and a channel change message is included in an image captured by the image capturing operation, the processor 140 may identify an occurrence of a channel change event.

The processor 140 may use a different method other than a method of comparing audio signals or video signals before and after the mute interval to identify whether a channel change event occurs. The processor 140 may confirm whether a channel change message (e.g., On Screen Display (OSD)) is displayed within a preset (or predetermined) period of time from the beginning of the mute interval to identify whether a channel change event occurs, and if the channel change message is identified as being displayed, the processor 140 may identify that a channel change event occurs.

When a channel change event in which a broadcasting content is changed to another broadcasting content is identified, the processor 140 may perform image analyzing to obtain information on the changed broadcasting content. When an image to be output is captured, and a channel change message displayed at channel change is included in the captured image, the processor 140 may obtain texts or logos from the channel change message and obtain information on the changed channel.

Figure 4:
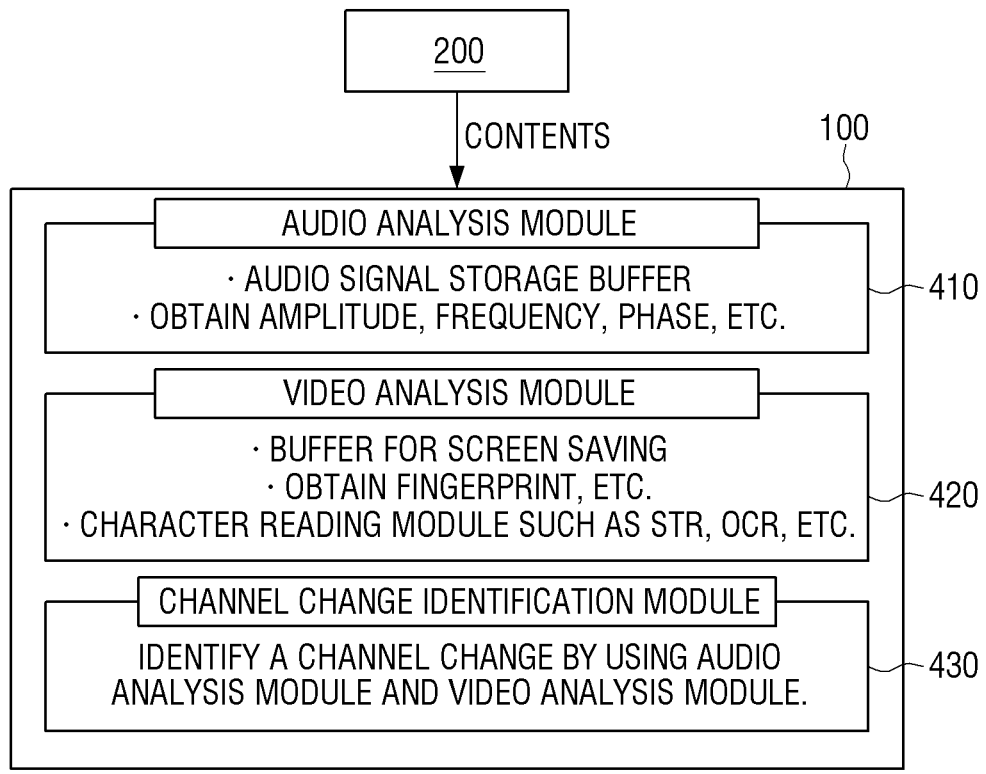
FIG. 4 is a concept diagram illustrating an electronic apparatus according to an embodiment of the disclosure.

FIG. 4 is a concept diagram illustrating an electronic apparatus according to an embodiment of the disclosure.

Referring to FIG. 4, the electronic apparatus 100 may be connected to the content providing apparatus 200 through the interface 110, and may receive contents of various channels from the content providing apparatus 200 through the interface 110.

The electronic apparatus 100 may include an audio analysis module 410, a video analysis module 420, and a channel change identification module 430. According to an embodiment, some of constituent elements may be omitted. The functions of the audio analysis module 410, the video analysis module 420, and the channel change identification module 430 may be performed by the processor 140.

The audio analysis module 410 may capture and analyze an audio signal input through the interface 110. The audio analysis module 410 may identify a mute interval from the audio signal. In other words, the beginning and end of carrier absence may be identified.

The audio analysis module 410 may obtain audio feature information (e.g., a frequency, a phase, an audio fingerprint, etc.) from audio signals right before and right after the mute interval. The audio feature information right before and right after the mute interval may be stored as a concept of snapshot. The audio analysis module 410 may compare audio feature information before the mute interval and audio feature information after the mute interval and identify discontinuity of the audio signals before and after the mute interval.

The video analysis module 420 may capture and analyze a video signal input through the interface 110. When the audio analysis module 410 senses the beginning of the mute interval, the video analysis module 420 may obtain video feature information from the video signal right before the mute interval. The video analysis module 420 may sense the end of the mute interval in the audio analysis module 410 and obtain video feature information from the video signal right after the mute interval. The video feature information may be, for example, video fingerprint. The video feature information right before and right after the mute interval may be stored as a concept of snapshot. The video analysis module 420 may compare video feature information before the mute interval with video feature information after the mute interval and identify the discontinuity of the video signals before and after the mute interval.

The video analysis module 420 may detect whether a channel change message is included in an image. The video analysis module 420 may identify a channel change message area in the captured image, and obtain information on the content of the changed channel from the identified channel change message area. There are various ways to detect if there is a channel change message. For example, a channel change message may be detected by using an artificial intelligence model trained by using a number of channel change messages as training data. A template may be used, or a channel change message may be detected by using recognizing and matching all texts by using an optical character recognition (OCR) technique or a scene text recognition (STR) technique.

For example, a channel change message may be a banner, an OSD, etc. displayed when a channel is changed. The video analysis module 420 may obtain texts (e.g., a channel call sign, a channel name, a program title, a channel number, a broadcasting station name, etc.) by using the STR, OCR, etc. The video analysis module 420 may obtain images such as changed channel logos, broadcast logos, etc. from the channel change message.

The channel change identification module 430 may identify whether a channel is changed based on the analyzing result of the audio analysis module 410 and the video analysis module 420.

The processor 140 may analyze an audio signal input to the electronic apparatus, compare an audio signal before the mute interval with an audio signal after the mute interval when the mute interval is detected, identify whether the audio signals before and after the mute interval are continuous, and identify an occurrence of a channel change event in which a broadcasting content is changed to another broadcasting content based on the identification result.

Figure 5:
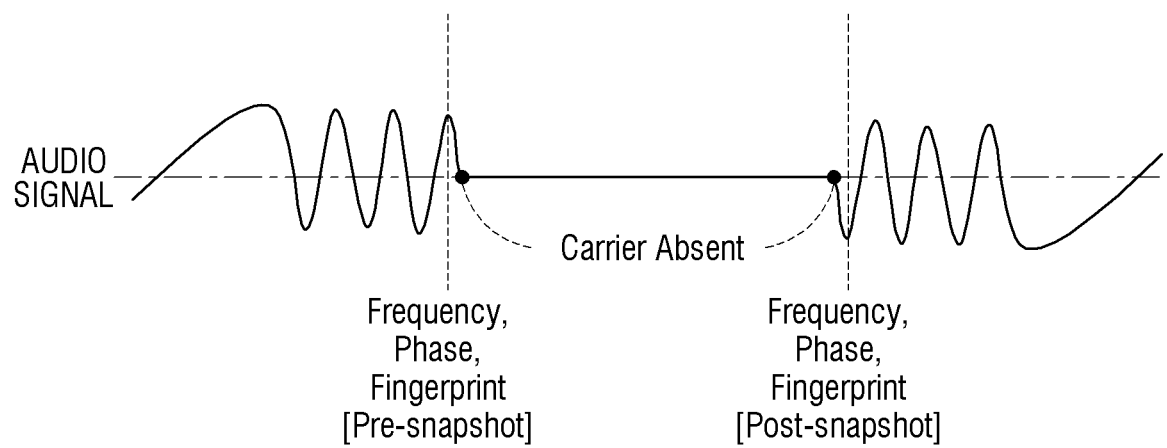
FIG. 5 is a view to explain an operation according to an embodiment of the disclosure when a mute interval of an audio signal is identified.

FIG. 5 is a view to explain an operation according to an embodiment of the disclosure when a mute interval of an audio signal is identified.

FIG. 5 shows an audio signal waveform, and when an audio signal corresponding to a content before channel change is provided and a channel is changed, a carrier absence section may occur, and an audio signal corresponding to a content provided by the changed channel after the mute interval may be provided. By comparing a snapshot right before the mute interval (at least one of audio feature information and video feature information) with a snapshot right after the mute interval (at least one of audio feature information and video feature information) and identify that a channel change event occurs when the signals before and after the mute interval are discontinuous.

Figure 6:
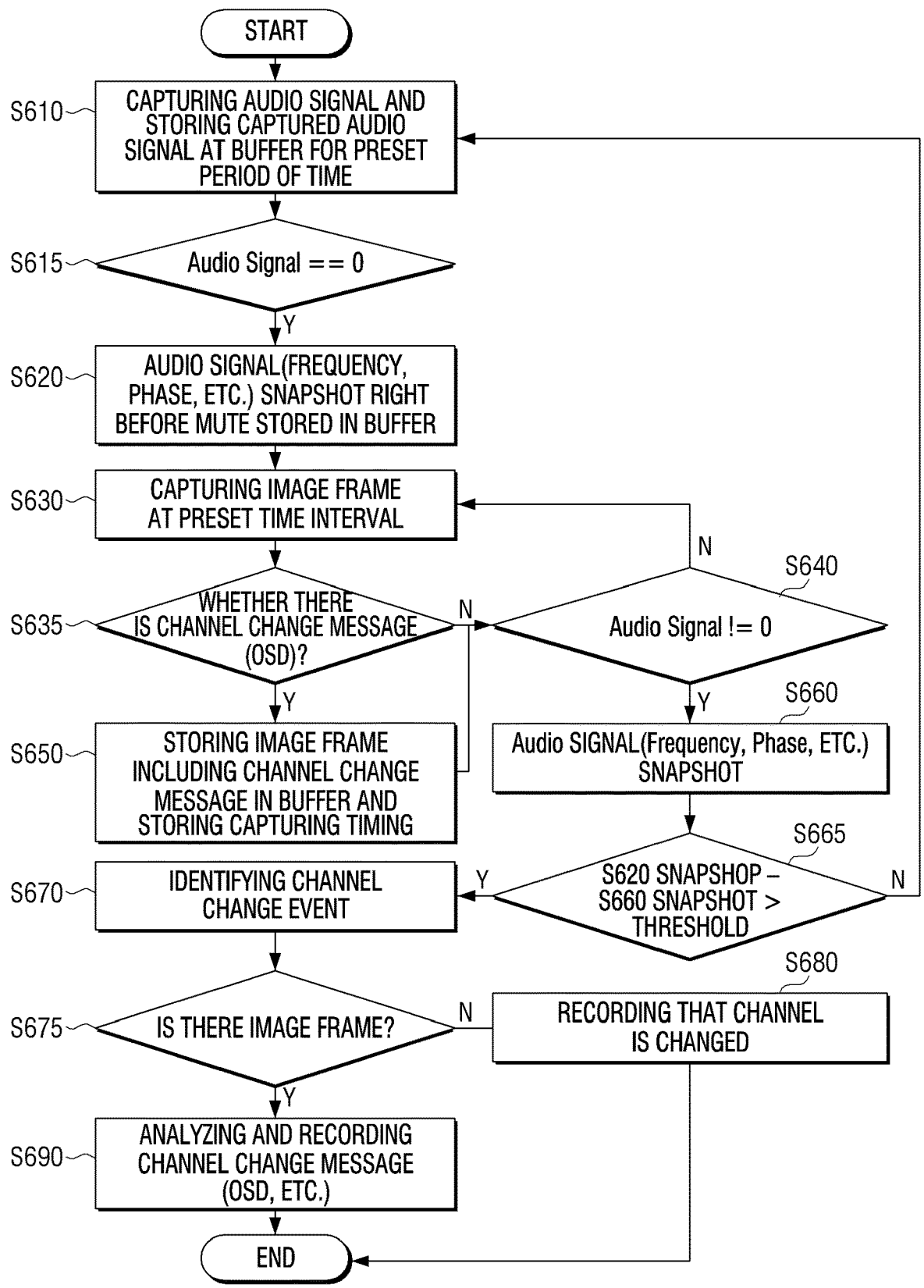
FIG. 6 is a flowchart to explain an embodiment of the disclosure in which a channel change event is confirmed by comparing an audio signal before a mute interval with an audio signal after the mute interval.

FIG. 6 is a flowchart to explain an embodiment for confirming a channel change event by comparing an audio signal before a mute interval with an audio signal after the mute interval and identifying a channel change event.

Referring to FIG. 6, the processor 140 may capture an audio signal input through the interface 110 and store the audio signal in a buffer at a preset (or predetermined) time at step S610. The processor 140 may sense carrier absence at an audio signal at step S615. When carrier absence is sensed, feature information of an audio signal right before carrier absence may be obtained at step S620. For example, a snapshot such as a frequency, a phase, etc. may be obtained.

The processor 140 may capture an image at a preset period of time when carrier absence is sensed at step S630. The processor 140 may identify whether a channel change message area is present in the captured image frames at step S635. The processor 140 may store an image frame including a channel change message area among the captured image frames in a buffer, and store a timing at which the image frame is captured at step S650.

When it is identified that a mute interval is terminated at step S640, the processor 140 may obtain feature information of the audio signal right after the mute interval at step S660. For example, a snapshot such as a frequency, a phase, etc. may be obtained. The processor 140 may identify whether a difference between the snapshot obtained at step S620 and a snap shot obtained at step S660 is greater than a threshold value at step S665. For example, the processor 140 may identify whether a difference between the frequency patterns is greater than a threshold value, or a phase difference is greater than a threshold value. It is also possible to identify a frequency pattern and a phase difference. When it is determined that the difference is greater than a threshold value, the processor 140 may identify that a channel change event occurs at step S670.

The threshold value used at step S665 may be obtained through an artificial intelligence deep learning. The threshold value may vary depending on a set-up device, a service provider, an internet state, etc. The threshold value may be trained in various environments (a set-top device, a service provider, an internet state, etc.) to derive an optimal threshold value and help identify a threshold value.

The processor 140 may identify whether an image frame including a channel change message stored at step S650 is present at step S675. When there is an image frame, the image frame may be analyzed and recorded at step S690. For example, the processor 140 may acquire texts from the image frame through the OCR, etc. and obtain information on the changed channel. For example, the channel information may include at least one of a channel number, a program title broadcasted on the channel, a broadcasting station name, a channel name, etc. When there is no image frame including a channel change message, the processor 140 may record only that a channel change event is identified at step S680.

Figure 7:
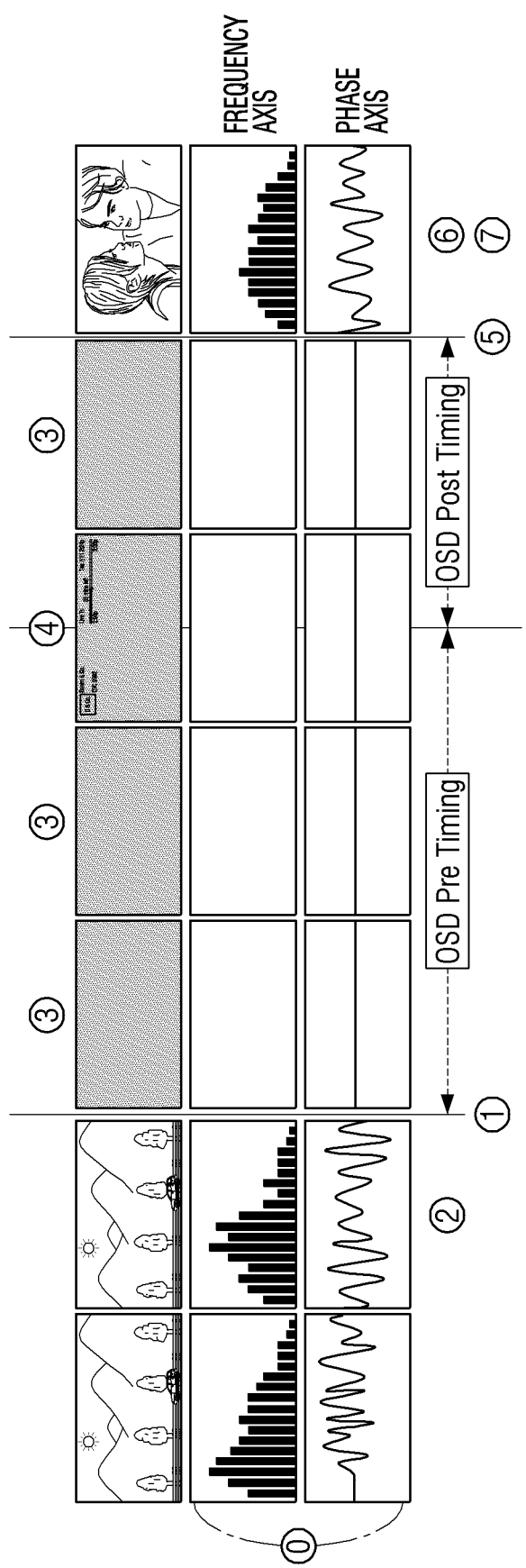
FIG. 7 is a view to explain various embodiments of the disclosure for confirming a channel change event by comparing an audio signal before a mute interval with an audio signal after the mute interval step by step.

FIG. 7 is a view to explain an embodiment for identifying a channel change event by comparing an audio signal before a mute interval with an audio signal after the mute interval and identifying continuity of the audio signal step by step.

Referring to FIG. 7, a first row among three rows illustrates a screen as time passes, a second row illustrates an audio frequency pattern as time passes, and a third row illustrates an audio phase as time passes.

Steps performed in an example embodiment shown in FIG. 7 are summarized as below. The figures shown in FIG. 7 indicate respective steps.

Step 0: storing an audio signal at a preset time interval (e.g., every 1 second) and sensing the audio signal in real time.

Step 1: sensing the beginning of carrier absence from the audio signal.

Step (2) storing an audio signal right before the beginning of the carrier absence as a snapshot.

Step 3: starting image capturing and capturing an image at regular intervals.

Step 4: sensing a channel change message (OSD, etc.), timing recording, and storing the captured image frame in a buffer.

Step 5: sensing the end of the carrier absence from the audio signal

Step 6: storing an audio signal right after the carrier absence as a snapshot.

Step 7: comparing snap shots before and after the mute interval.

The above-steps will be described in detail as below.

At step 0, an audio signal may be stored in a buffer at a preset time interval and a mute interval may be sensed in real time. The preset time interval may be an interval of 1 second.

In step 1, the input audio signal may be analyzed to detect carrier absence (when the audio signal becomes 0). It can be considered that the amplitude has become 0 and the mute has actually started.

At step 2, information on at least one of a frequency or a phase right before an audio signal becomes 0 may be stored as a concept of a snapshot. The snapshot may be compared with a snapshot obtained at step 6.

At step 3, image capturing may be started. In this case, since the audio signal itself is 0, an audio frequency or a phase may also be 0. The image capturing may be performed at a preset time interval. Image capturing may be performed in a basic unit time (e.g., 0.5 sec) at an initial step, but the unit time may be updated since it is possible to estimate the timing at which the OSD is displayed from the beginning of the carrier absence based on the value of the OSD Pre Timing and the OSD Post Timing collected in step 4. Image capturing may be performed with the updated unit time afterwards.

At step 4, a message displayed when a channel is changed such as an OSD, a channel banner, etc. may be identified from the captured image. There are various ways to detect whether there is a channel change message. For example, a channel change message may be sensed by using an artificial intelligence model trained using a number of channel change messages as training data. A template may be used, or a channel change message may be identified using a method for recognizing and matching all texts through an OCR technique or an STR technique. When the channel change message is confirmed, a timing thereof, that is, a timing (OSD Pre Timing) from the start of the mute interval until the channel change message appears, or a timing (OSD Post Timing) from when the channel change message appears to the end of the mute interval may be recorded. The time and date at which the channel change message is confirmed may be recorded. For example, the time and date at which an image frame including a channel change message is captured may be recorded. The captured image frame including the channel change message may be stored in a buffer.

At step 5, the end of carrier absence may be sensed. In other words, an audio signal may be picked up again. It can be seen that an amplitude is greater than 0. When the audio signal is picked up, step 5 may move on to step 6. According to an embodiment, when the end of carrier absence is sensed, the processor 140 may terminate an image capturing operation. In other words, a memory cost may be reduced by performing an image capturing operation only during the carrier absence.

At step 6, as in the same manner in step 2, information on at least one of a frequency or a phase right after an audio signal is picked up again may be stored as a concept of a snapshot.

Figure 8:
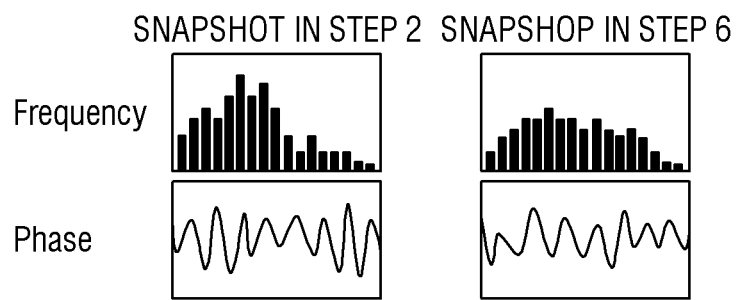
FIG. 8 is a view to explain various embodiments of the disclosure for confirming a channel change event by comparing an audio signal before a mute interval with an audio signal after the mute interval step by step.

At step 7, a difference between a snapshot stored in step 2 and a snapshot stored in step 6 may be identified. For ease of explanation, FIG. 8 shows the snapshot stored in step 2 and the snapshot stored in step 6 separately. Referring to FIG. 8, a frequency pattern in step 2 and a frequency pattern in step 6 may be clearly different. In the case of a phase, it is shown that the phase of step 2 and the phase of step 6 are not naturally connected. When the two frequency patterns are significantly different from each other, and a phase is not connected, it can be seen that a channel is changed and another content is provided.

When a difference between the frequency pattern of the audio signal before the mute interval and the frequency pattern of the audio signal after the mute interval is greater than a threshold value, the processor 140 may identify an occurrence of a channel change event. When a difference between a phase of the audio signal before the mute interval and a phase of the audio signal after the mute interval is greater than a preset threshold value, the processor 140 may identify an occurrence of a channel change event.

Figure 9:
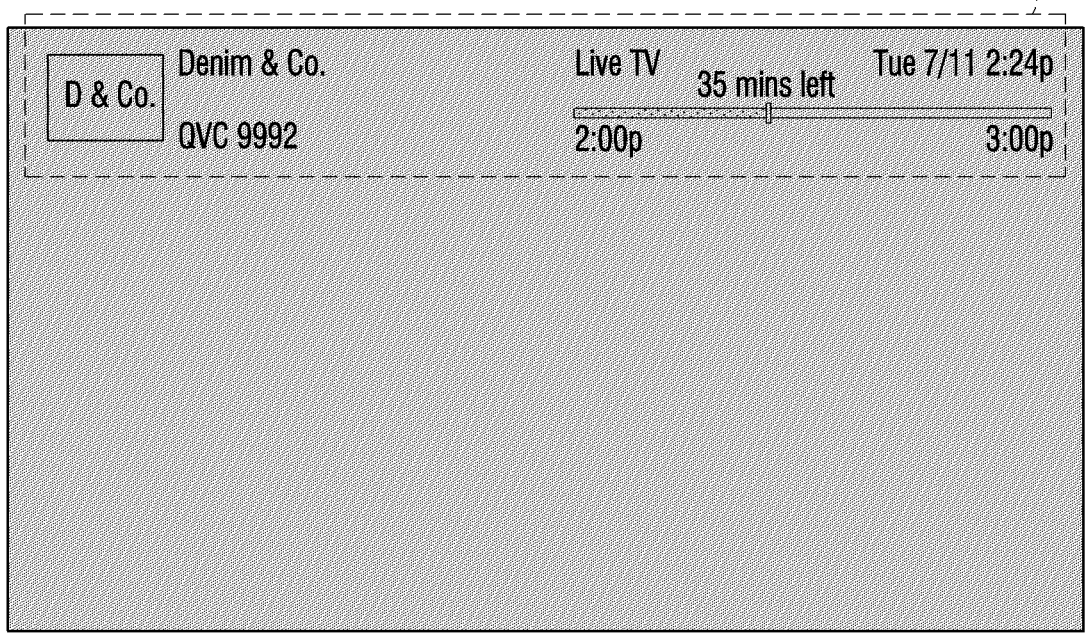
FIG. 9 is a view to explain various embodiments of the disclosure for confirming a channel change event by comparing an audio signal before a mute interval with an audio signal after the mute interval step by step.

The final step may include, when it is identified that a channel change event occurs, analyzing the captured image frame stored in step 4. FIG. 9 illustrates the image frame captured in step 4. Channel information such as a channel name, a channel number, a program title on the channel, a broadcasting station name, etc. may be acquired by using the OCR, STR, etc. from a channel change message 910 included in the captured image frame. The obtained channel information may be transmitted to an external server to be analyzed, or analyzed in the electronic apparatus 100 itself. An occurrence of a channel change may be recorded without step 4 in which a channel change message is sensed.

The electronic apparatus 100 may obtain viewing pattern information based on information on the changed channel and electronic program guide (EPG) metadata. For example, the electronic apparatus 100, by using the time and date at which an image including a channel change message is captured, the changed channel's name, may obtain a program title broadcasted on the channel on the time and date from the EPG metadata. Based thereon, it can be identified what program a user watches. In other words, the viewing pattern information of the user of the electronic apparatus 100 may be obtained. According to another embodiment, the electronic apparatus 100 may transmit the information on the changed channel, the time and date at which the image is captured, etc. to an external server, and the external server may obtain a program title broadcasted on the channel on the time and date from the EPG metadata. Based thereon, the external server may investigate a viewing pattern of the user of the electronic apparatus 100.

According to another embodiment, the electronic apparatus 100 may transmit information such as a program title broadcasted in the channel, an image capturing time, and a date to an external server, and the external server may obtain environment information of the electronic apparatus 100 (e.g., information on a set-top box connected to the electronic apparatus 100, a postal code, a city, a state, a country, etc.) based on the received information and EPG metadata.

Figure 10:
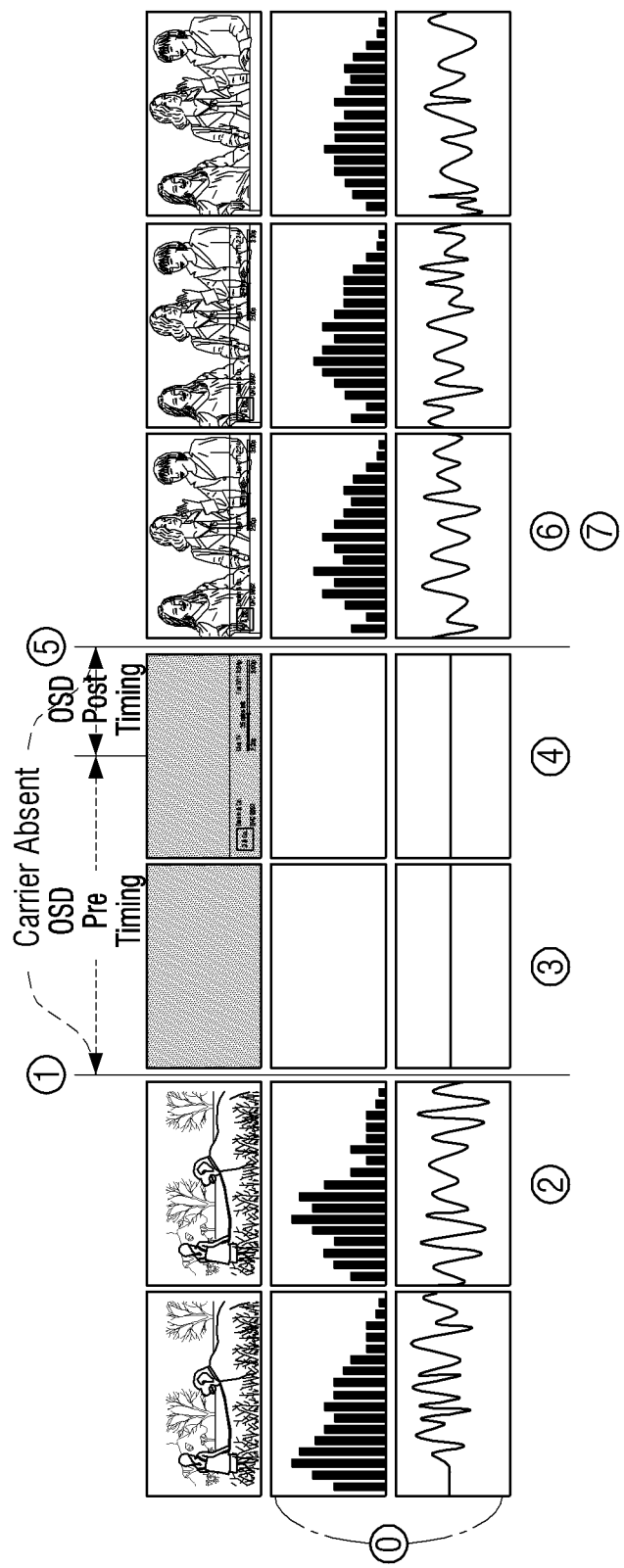
FIG. 10 is a view to explain various embodiments of the disclosure for confirming a channel change event by comparing an audio signal before a mute interval with an audio signal after the mute interval step by step.
Figure 11:
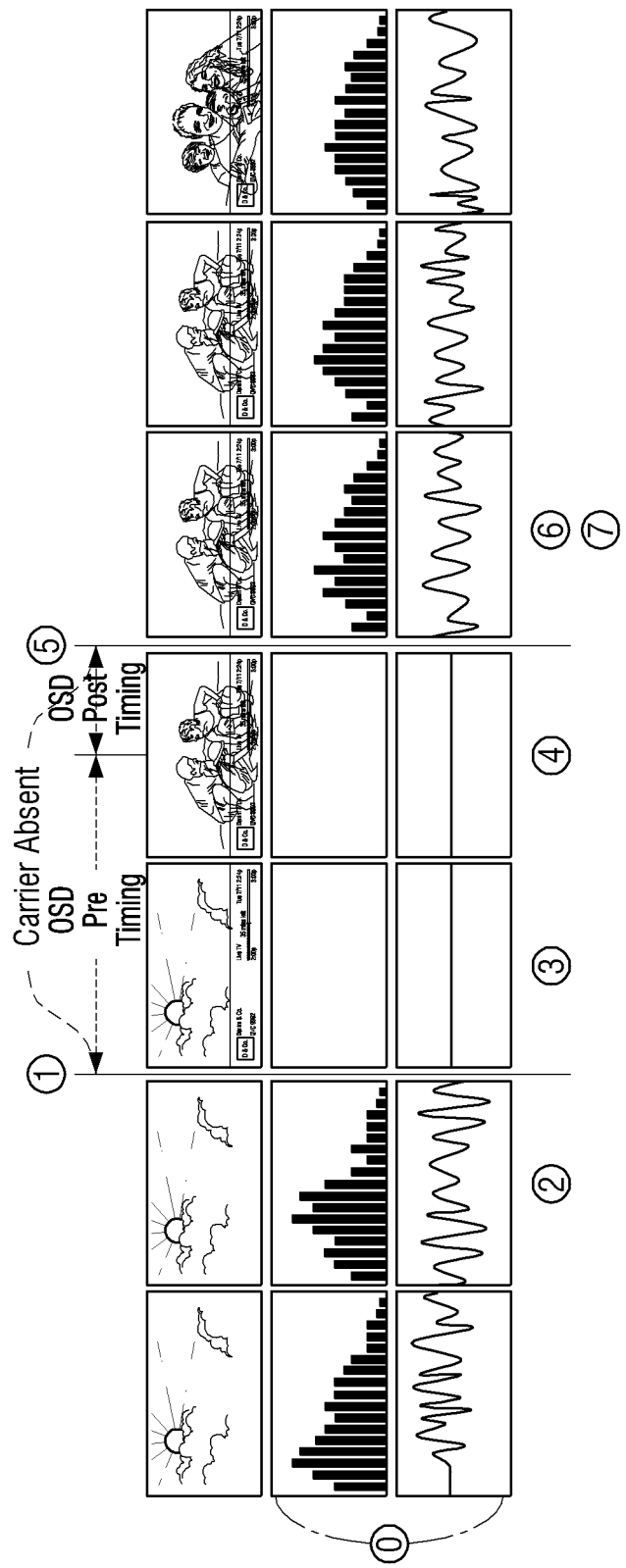
FIG. 11 is a view to explain various embodiments of the disclosure for confirming a channel change event by comparing an audio signal before a mute interval with an audio signal after the mute interval step by step.

In a normal case, a section in which a black screen is displayed (NULL section) upon changing a channel may be about 2 to 4 seconds. In some cases, the NULL section may be very short. For example, the NULL section may be very short as shown in FIG. 10. From comparison between FIG. 7 and FIG. 10, it can be seen that the NULL section in FIG. 10 is shorter that in FIG. 7. An image capture interval can be made shorter to avoid missing a channel change message. A channel change message may be maintained during a preset period of time after a mute interval, and thus an image capturing operation may be maintained until a preset time after the mute interval. In some cases, a NULL section may not be displayed and only a screen may be changed. For example, referring to FIG. 11, only the screen may be changed while an OSD is displayed between channel changes shown in FIG. 11, an occurrence of a channel change event may be accurately identified in all those various cases according to an embodiment of the disclosure.

Figure 12:
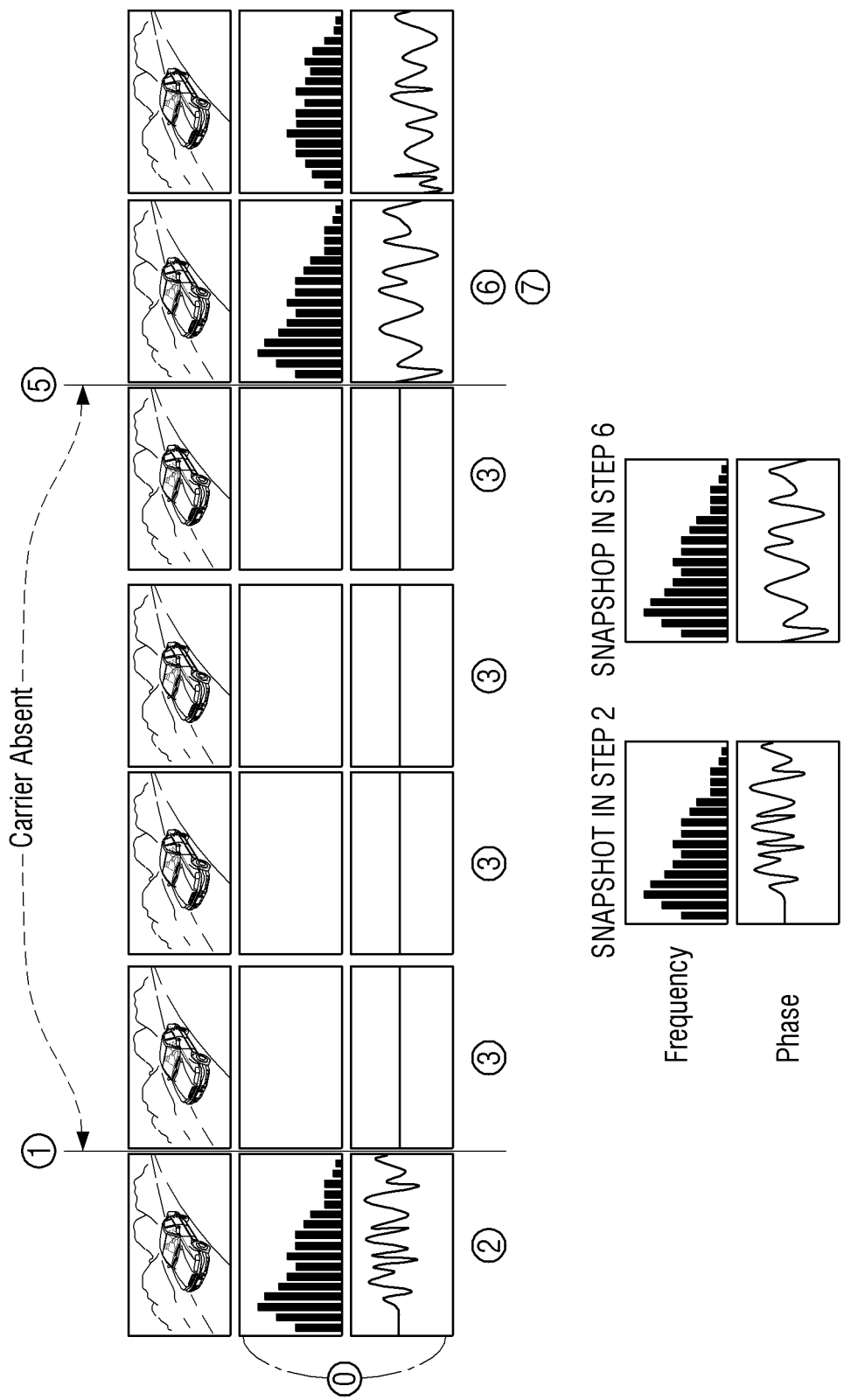
FIG. 12 is a view to explain an operation of an electronic apparatus according to an embodiment of the disclosure when an image is stopped.

FIG. 12 is a view to explain an operation of an electronic apparatus according to an embodiment of the disclosure when an image is stopped.

Referring to FIG. 12, a mute interval may occur during a buffering or even when a pause command is input from a user. With respect to a frequency pattern, snapshots in step 2 and step 6 may be the same, and a phase in step 2 and a phase in step 6 may be naturally continued. Therefore, the processor 140 may identify that a channel change event has not occurred. The processor 140 may identify that a channel change event has not occurred when a difference between frequency patterns before and after the carrier absence is smaller than a preset threshold value. The processor 140 may identify that a channel change event has not occurred when a difference between phases before and after the mute interval is smaller than a threshold value.

The above-described examples explain that a channel change is identified based on the frequency and the phase of audio before and after the mute interval. However, according to another example embodiments, whether a channel is changed may be identified based on fingerprint of video before and after the mute interval.

Figure 13:
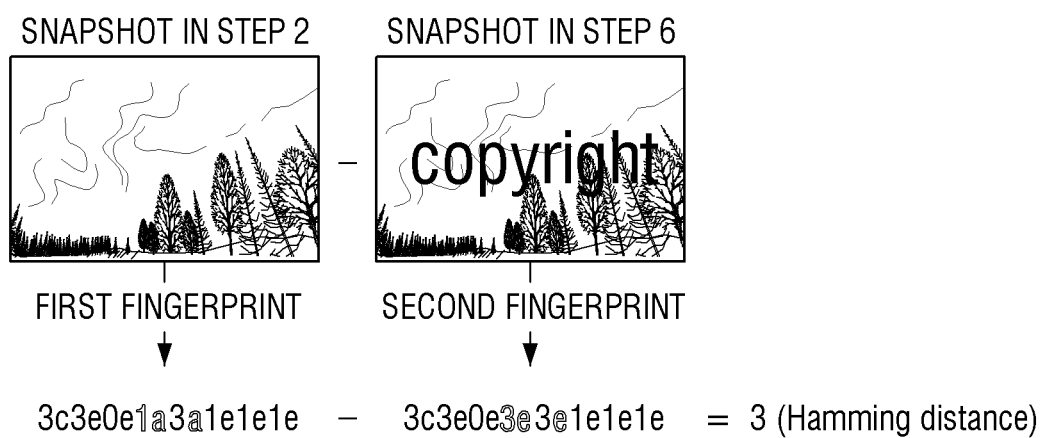
FIG. 13 is a view to explain an embodiment of the disclosure for identifying whether a channel is changed by using video fingerprint.

FIG. 13 is a view to explain an embodiment of the disclosure for identifying whether a channel is changed by using video fingerprint.

Referring to FIG. 13, video fingerprint may be used as snapshots in step 2 and step 6 explained with reference to FIG. 7. When a difference between first fingerprint obtained from a video signal before the mute interval and second fingerprint obtained from a video signal after the mute interval is greater than a preset threshold value, it is identified that a channel is changed, and when the difference is smaller than or equal to the preset threshold value, it may be identified that a channel is not changed. For example, when a hamming distance value is smaller than or equal to a preset value, it may be identified that a channel is not changed.

According to another embodiment of the disclosure, considering both the audio signal feature and the video signal feature, whether a channel is changed may be identified. For example, when the audio signals before and after the mute interval are identified as being discontinuous, the processor 140 may compare first fingerprint obtained from an image signal before a mute interval with second fingerprint obtained from an image signal input after the mute interval, and, based on the comparison between the first fingerprint and the second fingerprint, when the images before and after the mute interval are identified as being discontinuous, the processor 140 may identify an occurrence of a channel change event. In other words, it can be identified that a channel is changed only when both of the conditions that the audio signal is discontinuous and the video signal is discontinuous are all satisfied.

According to another embodiment of the disclosure, without comparing audio/video signals before and after the mute interval, a channel change event may be identified by way of confirming whether a channel change message is displayed from the beginning of the mute interval within a preset period of time. This will be described with respect to FIG. 14.

Figure 14:
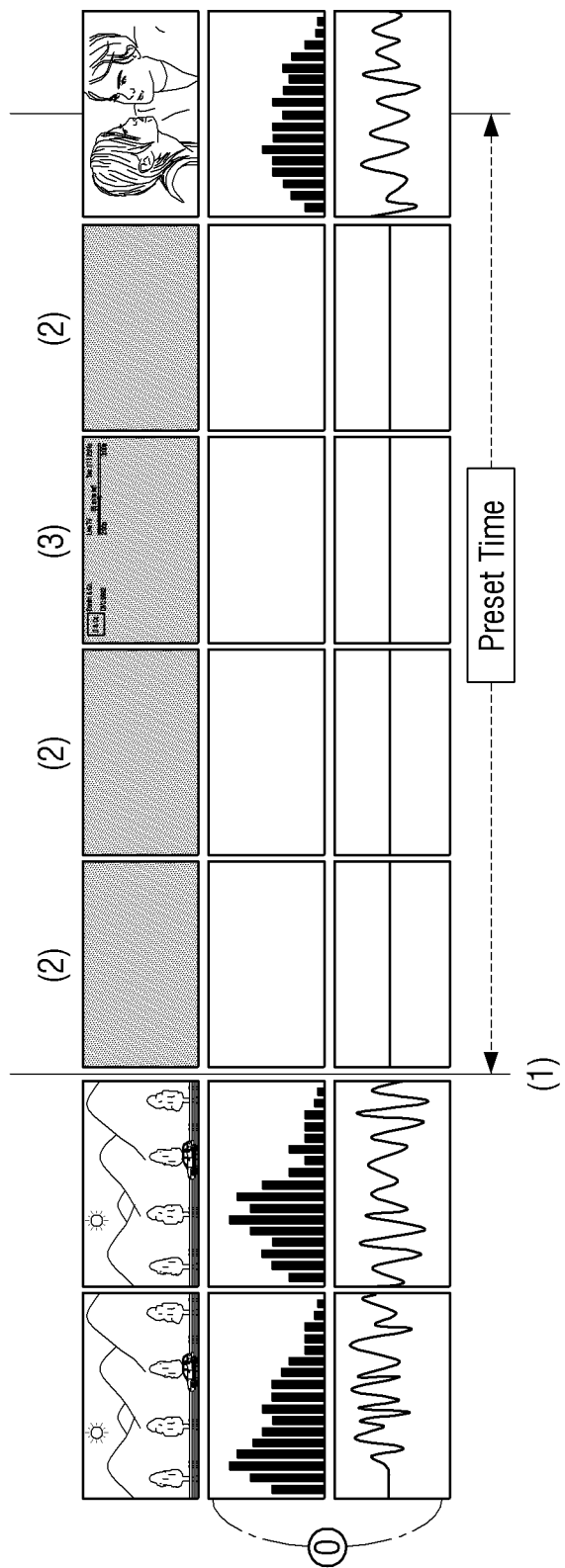
FIG. 14 is a view to explain an embodiment of the disclosure for identifying a channel change event by way of checking whether a channel change message is displayed within a preset time from a beginning of the mute interval.

Referring to FIG. 14, when a mute interval start is sensed (1), the processor 140 may capture an image at a preset time interval by performing an image capturing operation (2). When a channel change message is sensed within a preset time from the mute interval start (3), it may be identified that a channel change event occurs. Information on the changed channel may be obtained by analyzing an image including a channel change message.

Figure 15:
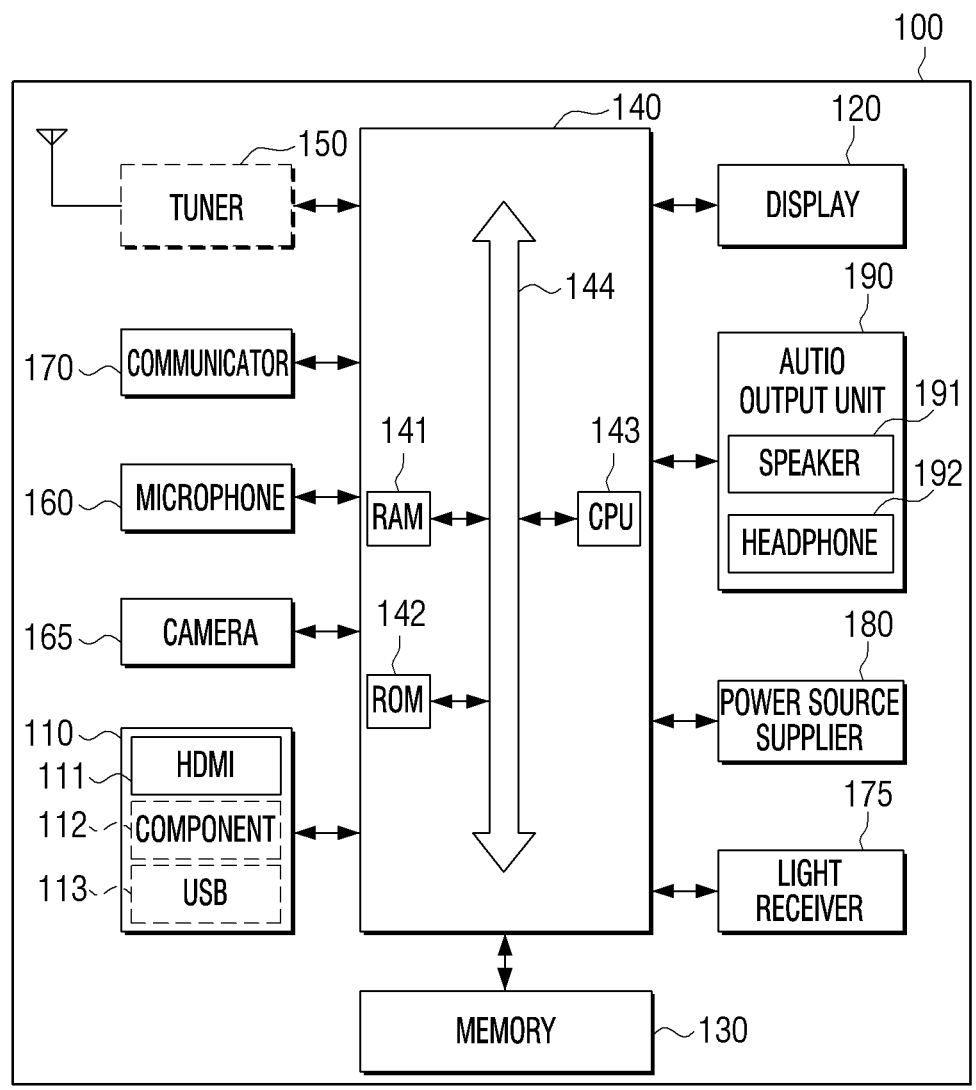
FIG. 15 is a block diagram to explain configuration of an electronic apparatus according to another embodiment of the disclosure.

FIG. 15 is a block diagram to explain configuration of an electronic apparatus according to another embodiment of the disclosure. According to implementation, although not shown, hardware/software constituent elements suitable enough to those skilled in the art may be further included in the electronic apparatus 100. According to embodiments, some constituent elements may be excluded.

The electronic apparatus 100 may be, for example, an analog TV, a digital TV, a 3D-TV, a smart TV, an LED TV, an OLED TV, a plasma TV, a monitor, a curved TV with a fixed curvature screen, a flexible TV having a screen with a fixed curvature, a bended TV having a screen with a fixed curvature, and/or a curvature-variable TV capable of changing the curvature of the current screen by the received user input, but is not limited thereto.

The tuner 150 may amplify broadcast, and resonate a broadcast signal received wiry or wirelessly, and tune and select only the frequency of a channel to be received at the electronic apparatus 100 among many electromagnetic wave components. The broadcast signal may include video, audio, and additional data (e.g., Electronic Program Guide (EPG)).

The tuner 150 may receive video, audio and data in a frequency band corresponding to a channel number according to a user input.

The tuner 150 may receive broadcasting signals from various sources such as terrestrial broadcasting, cable broadcasting, or satellite broadcasting. The tuner 150 may receive broadcasting signals from various sources such as analog broadcasting or digital broadcasting.

The tuner 150 may be integrally embodied with the electronic apparatus 100 in all-in-one type, or embodied as an additional apparatus including a tuner unit electrically connected to the electronic apparatus 100 (e.g., a set-top box, and a tuner connected to the interface 110).

The communicator 170 may be connected to a network to communicate with at least one external device. The network may include at least one of a telecommunications network, e.g., a computer network (e.g., LAN or WAN), Internet, or telephone network. The communicator 170 may include, for example, a cellular module, a WiFi module, a Bluetooth module, a GNSS module (e.g., a GPS module, a Glonass module, a Beidou module, or a Galileo module), an NFC module and a radio frequency module. Each of the WiFi module, the Bluetooth module, the GNSS module, or the NFC module may include a processor for processing data transmitted and received through the corresponding module, for example. According to some embodiments, at least some (e.g., two or more) of the cellular module, the WiFi module, the Bluetooth module, the GNSS module, or the NFC module may be included in one integrated chip (IC) or IC package. The RF module may transmit and receive, for example, a communication signal (e.g., an RF signal). The RF module may include, for example, a transceiver, a power amplifier module (PAM), a frequency filter, a low noise amplifier (LNA), or an antenna. According to another embodiment, at least one of the cellular module, the WiFi module, the Bluetooth module, the GNSS module, or the NFC module may transmit and receive an RF signal through a separate RF module.

The processor 140 may transmit and receive various information to and from an external device through the communicator 170. For example, when a channel change event is identified, the processor 140 may control the communicator 170 to transmit information on the changed channel, information on the time and date at which the image including a channel change message is captured, etc. to the external device. The external server may obtain the pattern and history for the content viewing of the electronic apparatus 100 based on the received information.

The electronic apparatus 100 may be connected to a user terminal device through the communicator 170. For example, the electronic apparatus 100 may communicate with a user terminal device (e.g., a smartphone) in a communication method such as Bluetooth, WiFi, etc.

The microphone 160 may receive sounds, convert the received sounds into electrical signals and output the electrical signals to the processor 140. A user voice may be received through the microphone 160, and the processor 140 may perform an operation corresponding to the received user voice.

The microphone 160 may be integrally embodied with the electronic apparatus 100 or separated from the electronic apparatus 100. The separated microphone 160 may be electrically connected to the electronic apparatus 100.

The camera 165 may capture an image, and the captured image may be used for user motion recognition. The camera 165 may be integrally embodied with the electronic apparatus 100, and separated from the electronic apparatus 100. The separated camera 165 may be electrically connected to the electronic apparatus 100.

The interface 110 may be connected to an external device.

The interface 110 may include at least one of a High-Definition Multimedia Interface port (HDMI port) 111, a component input jack 112, and a USB port 113. In addition to what is shown, the interface 110 may include at least one of ports such as RGB, DVI, HDMI, DP, thunderbolt, etc.

The audio output unit 190 may output audio, for example, audio included in a broadcasting signal received through the tuner 150, audio input through the communicator 170, the interface 110, etc., and audio included in an audio file stored in the memory 130. The audio output unit 190 may include a speaker 191 and a headphone output terminal 192.

The memory 130 may store various data, programs or applications for driving and controlling the electronic apparatus under the control of the processor 140. The memory 130 may store signals or data input/output corresponding to the driving of the tuner 150, the communicator 170, the microphone 160, the camera 165, the interface 110, the display 120, the audio output unit 190 and the power source supplier 180. The memory 130 may store data for forming various UI screens provided by the display 120. The memory 130 may store data for generating control signals corresponding to various user interactions. The memory 130 may store training data and template information used for object detection.

The memory 130 may be implemented as a nonvolatile memory, a volatile memory, a flash memory, a hard disk drive (HDD), or a solid state drive (SSD). The memory 130 may be embodied not only as a storage medium in the electronic apparatus 100 but also as an external storage medium such as a micro SD card, a USB memory or a Web server via a network.

The power source supplier 180 may supply power input from an external power source to constituent elements in the electronic apparatus 100 under the control of the processor 140.

The display 120 may include, for example, a liquid crystal display (LCD), a light-emitting diode (LED) display, an organic light-emitting diode (OLED) (e.g., active-matrix organic light-emitting diode (AMOLED), a passive-matrix OLED (PMOLED)), or a microelectromechanical systems (MEMS) display.

The display 120 may display various images. For example, an image including texts, images, videos, icons, symbols, etc. may be displayed. In addition, the display 120 may display a UI object.

The light receiver 175 may be configured to receive a control signal from the outside. For example, an infrared control signal (e.g., an IR pulse) may be received from a remote control device. The electronic apparatus 100 may perform various operations according to a control signal received from the remote control device.

The processor 140 may control the overall operation of the electronic apparatus 100 and the signal flow between internal constituent elements of the electronic apparatus 100, and perform a data processing function. The processor 140 may control power supplied from the power source supplier 180 to the internal constituent elements.

The processor 140 may include a RAM 141, a ROM 142, a CPU 143 and a bus 144. The RAM 141, the ROM 142, the CPU 143, and the like may be connected to one another via the bus 144. The processor 140 may be implemented as a System On Chip (SoC).

The CPU 143 may access the memory 130 and perform booting by using the O/S stored in the memory 130. In addition, the CPU 143 may perform various operations by using programs, contents, data, etc. stored in the memory 130.

The ROM 142 may store a command set, etc. for system booting. When a turn-on command is input and power is supplied, the CPU 143 may copy the O/S stored in the memory 130 to the RAM 141 according to the command stored in the ROM 142, execute the O/S and perform system booting. When the booting is completed, the CPU 143 may copy various application programs stored in the memory 130 to the RAM 252, execute the application program copied to the RAM 141, and perform various operations.

The processor 140 may perform functions of various example embodiments described in FIG. 1 to FIG. 14.

The processor 140 may execute a computer executable command stored in the memory 130 and control the display 120 to display an image corresponding to a broadcasting content input through the interface 110. When a mute interval is detected by analyzing the input audio signal, the processor 140 may compare an audio signal before the mute interval with an audio signal after the mute interval, identify whether the audio signals before and after the mute interval are continuous, and identify a channel change event in which the broadcasting content is changed to another broadcasting content based on the identification result.

When a difference between a frequency pattern of the audio signal before the mute interval and a frequency pattern of the audio signal after the mute interval is greater than a preset threshold value, the processor 140 may identify an occurrence of a channel change event.

When a difference between a phase of the audio signal before the mute interval and a phase of the audio signal after the mute interval is greater than a preset threshold value, the processor 140 may identify an occurrence of a channel change event.

The processor 140 may extract fingerprint from an image signal regularly. The extracted fingerprint may be used for identifying whether a channel is changed. For example, when it is determined that audio signals before and after the mute interval are discontinuous, the processor 140 may compare first fingerprint extracted from the image signal before the mute interval with second fingerprint extracted from the image signal after the mute interval, and, when it is identified that images before and after the mute interval are discontinuous based on the comparison between the first fingerprint and the second fingerprint, the processor 140 may identify an occurrence of a channel change event.

The processor 140 may perform an operation for capturing an image at a preset time interval from the beginning of the mute interval of audio, and, when the occurrence of the channel change event is identified, the processor 140 may analyze the captured images and obtain information on the changed channel.

The processor 140 may identify a channel change message in the captured image, and obtain information on the changed channel based on the texts included in the channel change message. The processor 140 may obtain information on the channel through the text recognition method such as OCR and STR. The processor 140 may extract broadcasting station logos, channel logos, etc. through an image recognition method and obtain information on the channel.

When it is identified that audio signals before and after the mute interval are discontinuous and a channel change message is included in the captured image, the processor 140 may identify an occurrence of a channel change event.

When it is identified that audio signals before and after the mute interval are continuous, the processor 140 may terminate the operation for capturing an image.

The processor 140 may obtain information on viewing pattern information based on the information on the changed channel, a time at which an image including a channel change message is captured and pre-stored EPG metadata.

Figure 16:
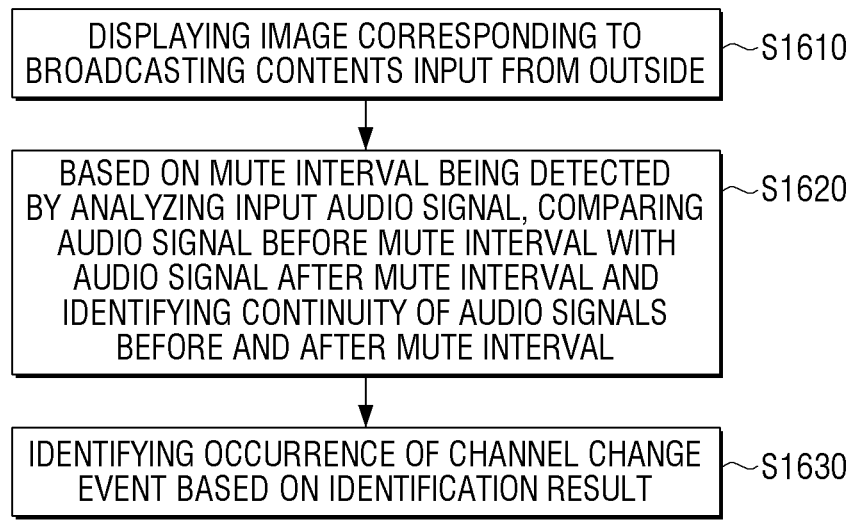
FIG. 16 is a flowchart to explain a controlling method for an electronic apparatus according to an embodiment of the disclosure.

FIG. 16 is a flowchart to explain a controlling method for an electronic apparatus according to an embodiment of the disclosure. The flowchart shown in FIG. 16 illustrates operations performed by the electronic apparatus 100 in the specification. Therefore, although omitted below, the description of the electronic apparatus 100 will be applied to the flowchart shown in FIG. 16.

Referring to FIG. 16, the electronic apparatus 100 may display an image corresponding to a broadcasting content input from the outside at step S1610. The electronic apparatus 100 may receive contents from various external input sources via an interface. For example, an over-the-top (OTT) device, a set-top box, a TV box (such as Apple TV™ or Google TV™), a digital video disc (DVD) player, a video cassette recorder (VCR), a Blu-ray player, a game machine, a computer, a server, and the like. The electronic apparatus 100 may display an image through a display provided therein. According to another embodiment, the electronic apparatus 100 may transmit an image signal to an external display apparatus connected to the electronic apparatus 100 and the external display apparatus may display an image.

When analyzing an input audio signal and detecting a mute interval, the electronic apparatus 100 may compare an audio signal before the mute interval with an audio signal after the mute interval and identify whether audio signals before and after the mute interval are continuous at step S1620.

An occurrence of a channel change event may be identified based on the continuity of the audio signal. According to another embodiment, an occurrence of a channel change event may be identified by comparing video signals before and after the mute interval. According to another embodiment, an occurrence of a channel change event may be identified by comparing video signals and audio signals before and after the mute interval. In an embodiment considering both audio signals and video signals, whether a channel is changed may be more accurately identified.

Comparing audio signals before and after the mute interval, may include comparing feature information of audio signals such as an amplitude, a phase, an amplitude, a video fingerprint, etc. Comparing video signals before and after the mute interval may include comparing video feature information such as a video fingerprint, etc.

The electronic apparatus 100 may identify an occurrence of a channel change event in which a broadcasting content is changed to another broadcasting content based on the identification result at step S1630.

When a difference between a frequency pattern of an audio signal before the mute interval and a frequency pattern of an audio signal after the mute interval is greater than a preset threshold value, the electronic apparatus 100 may identify an occurrence of a channel change event.

When a difference between a phase of an audio signal before the mute interval and a phase of an audio signal after the mute interval is greater than a preset threshold value, the electronic apparatus 100 may identify an occurrence of a channel change event.

When audio signals before and after the mute interval are identified as being discontinuous, the electronic apparatus 100 may compare first fingerprint obtained from an image signal before the mute interval with second fingerprint obtained from an image signal after the mute interval, and, based on the comparison between the first fingerprint and the second fingerprint, when images before and after the mute interval are identified as being discontinuous, the electronic apparatus 100 may identify an occurrence of a channel change event.

The electronic apparatus 100 may perform an image capturing operation from the beginning of the mute interval. For example, an image frame may be captured from the input image signal at a preset time interval. When audio signals before and after the mute interval are identified as being continuous, the electronic apparatus 100 may terminate the image capturing operation.

When the audio signals before and after the mute interval are identified as being discontinuous, and a channel change message is included in the captured image by the image capturing operation, the electronic apparatus 100 may identify an occurrence of a channel change event.

When a channel change event is identified, the electronic apparatus 100 may obtain information on the changed channel by analyzing image frames captured by the image capturing operation.

According to an embodiment of the disclosure, the electronic apparatus 100 may identify a channel change message from the image captured by the image capturing operation, and obtain information on the changed channel from the channel change message. For example, texts included in the channel change message may be obtained through Optical Character Recognition (OCR) or Scene Text Recognition (STR), and information on the changed channel may be acquired based on the obtained texts.

According to an embodiment of the disclosure, viewing pattern information may be obtained based on the information on the changed channel and electronic program guide (EPG) metadata.

According to various embodiments described above, since the channel change event can be identified using the occurrence of carrier absence of audio, there is an advantage that memory and CPU usage can be reduced as compared with the case of using screen analysis. In addition, according to embodiments of the disclosure, there is an advantage that an occurrence of a mute interval with no actual channel change such as buffering can be distinguished.

Meanwhile, the various embodiments described above can be implemented using software, hardware, or a combination thereof. According to a hardware implementation, the embodiments described in this disclosure may be implemented as application specific integrated circuits (ASICs), digital signal processors (DSPs), digital signal processing devices (DSPDs), programmable logic devices (PLDs) programmable gate arrays, a processor, a controller, a microcontroller, a microprocessor, and an electrical unit for performing other functions. According to software implementation, embodiments such as the procedures and functions described herein may be implemented in separate software modules. Each of the software modules may perform one or more of the functions and operations described herein.

Various embodiments of the disclosure may be embodied as software including commands stored in a machine-readable storage media that can be read by a machine (e.g., a computer). The machine may be an apparatus that can call stored commands from the storage medium and operate according to the called commands, and could include the electronic apparatus 100 in the above-described embodiments.

When the command is executed by a processor, the processor may perform the function corresponding to the command, either directly or using other components under the control of the processor. The commands may include codes generated or executed by a compiler or an interpreter. For example, a controlling method of the electronic apparatus 100 may be executed by executing the commands stored in the storage medium by the processor. For example, by executing the commands stored in the storage medium by the processor, operations may be performed, where the operations comprise displaying an image corresponding to a broadcasting content input from the outside, based on analyzing an input audio signal and detecting a mute interval, comparing an audio signal before the mute interval with an audio signal after the mute interval and identifying the continuity of the audio signals before and after the mute interval, and identifying an occurrence of a channel change event in which the broadcasting content is changed to another broadcasting content based on the identification result.

The machine-readable storage medium may be provided in the form of a non-transitory storage medium. 'Non-transitory' means that the storage medium does not include a signal and is tangible, but does not distinguish whether data is permanently or temporarily stored in a storage medium.

According to an example, a method according to various embodiments disclosed herein may be provided in a computer program product. The computer program product may be traded between a seller and a purchaser as a product. The computer program product may include a machine readable storage medium (e.g., compact disc read only memory (CD-ROM)) that can be read by a device, or distributed online via an application store (e.g., PlayStore™). In the case of on-line distribution, at least a portion of the computer program product may be temporarily stored, or temporarily generated, in a storage medium such as a manufacturer's server, a server of an application store, or a memory of a relay server.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although example embodiments have been shown and described, it will be appreciated by those skilled in the art that changes may be made to these example embodiments without departing from the principles and spirit of the present disclosure. Accordingly, the scope of the present invention is not construed as being limited to the described example embodiments, but is defined by the appended claims as well as equivalents thereto.

What is claimed is:

1. An electronic apparatus, comprising:
a memory configured to store computer executable instructions;
a display; and
a processor configured to, by executing the computer executable instructions:
control the display to display an image corresponding to a content,
based on a mute interval being detected by analyzing an input signal corresponding to the content, identify whether a first signal of the input signal before the mute interval and a second signal of the input signal after the mute interval are continuous by comparing a feature of the first signal with a feature of the second signal, and
based on identifying that the first signal and the second signal are not continuous, identify an occurrence of a channel change event in which the content is changed to another content.

2. The electronic apparatus as claimed in claim 1, wherein the first signal before the mute interval includes an audio signal, and the second signal after the mute interval includes an audio signal, and
wherein the processor is further configured to perform an image capturing operation from a beginning of the mute interval, and, based on the occurrence of the channel change event being identified, analyze an image captured by the image capturing operation and obtain information on a changed channel.

3. The electronic apparatus as claimed in claim 2, wherein the processor is further configured to identify a channel change message from the image captured by the image capturing operation, and obtain the information on the changed channel from the channel change message.

4. The electronic apparatus as claimed in claim 3, wherein the processor is further configured to acquire texts included in the channel change message through optical character recognition (OCR) or scene text recognition (STR), and obtain the information on the changed channel based on the acquired texts.

5. The electronic apparatus as claimed in claim 2, wherein the processor is further configured to identify the occurrence of the channel change event based on the audio signals before and after the mute interval being identified to be discontinuous and a channel change message being included in the image captured by the image capturing operation.

6. The electronic apparatus as claimed in claim 2, wherein the processor is further configured to terminate the image capturing operation based on the audio signals before and after the mute interval being identified to be continuous.

7. The electronic apparatus as claimed in claim 1, wherein the first signal before the mute interval includes an audio signal, and the second signal after the mute interval includes an audio signal, and wherein the processor is further configured to identify the occurrence of the channel change event based on a difference between a frequency pattern of the audio signal before the mute interval and a frequency pattern of the audio signal after the mute interval being greater than a preset threshold value.

8. The electronic apparatus as claimed in claim 1, wherein the first signal before the mute interval includes an audio signal, and the second signal after the mute interval includes an audio signal, and wherein the processor is further configured to identify the occurrence of the channel change event based on a difference between a phase of the audio signal before the mute interval and a phase of the audio signal after the mute interval being greater than a preset threshold value.

9. The electronic apparatus as claimed in claim 1, wherein the first signal before the mute interval includes an audio signal, and the second signal after the mute interval includes an audio signal, and wherein the processor is further configured to:

based on the audio signals before and after the mute interval being identified to be discontinuous, compare first fingerprint obtained from an image signal before the mute interval with second fingerprint obtained from an image signal after the mute interval, and based on images before and after the mute interval being identified to be discontinuous according to comparison between the first fingerprint and the second fingerprint, identify the occurrence of the channel change event.

10. A method for controlling an electronic apparatus, the method comprising:

displaying an image corresponding to a content;

based on a mute interval being detected by analyzing an input signal corresponding to the content, comparing a signal of the input signal before the mute interval with a signal of the input signal after the mute interval, and identifying whether a first signal of the input signal before the mute interval and a second signal of the input signal after the mute interval are continuous by comparing a feature of the first signal with a feature of the second signal; and based on identifying that the first signal and the second signal is not continuous, identifying an occurrence of a channel change event in which the content is changed to another content.

11. The method as claimed in claim 10, wherein the first signal before the mute interval includes an audio signal, and the second signal after the mute interval includes an audio signal, and wherein the method further comprises:

performing an image capturing operation from a beginning of the mute interval; and based on the occurrence of the channel change event being identified, analyzing an image captured by the image capturing operation and obtaining information on a changed channel.

12. The method as claimed in claim 11, wherein the obtaining of the information on the changed channel comprises identifying a channel change message from the image captured by the image capturing operation, and obtaining the information on the changed channel from the channel change message.

13. The method as claimed in claim 12, wherein the obtaining of the information on the changed channel comprises acquiring texts included in the channel change message through optical character recognition (OCR) and scene text recognition (STR), and obtaining the information on the changed channel based on the acquired texts.

14. The method as claimed in claim 11, wherein the identifying of the occurrence of the channel change event comprises identifying the occurrence of the channel change event based on the audio signals before and after the mute interval being identified to be discontinuous, and a channel change message being included in the image captured by the image capturing operation.

15. The method as claimed in claim 11, further comprising:

terminating the image capturing operation based on the audio signals before and after the mute interval being identified to be continuous.

16. The method as claimed in claim 10, wherein the first signal before the mute interval includes an audio signal, and the second signal after the mute interval includes an audio signal, and wherein the identifying of the occurrence of the channel change event comprises identifying the occurrence of the channel change event based on a difference between a frequency pattern of the audio signal before the mute interval and a frequency pattern of the audio signal after the mute interval being greater than a preset threshold value.

17. The method as claimed in claim 10, wherein the first signal before the mute interval includes an audio signal, and the second signal after the mute interval includes an audio signal, and wherein the identifying of the occurrence of the channel change event comprises identifying the occurrence of the channel change event based on a difference between a phase of the audio signal before the mute interval and a phase of the audio signal after the mute interval being greater than a preset threshold value.

18. The method as claimed in claim 10, wherein the first signal before the mute interval includes an audio signal, and the second signal after the mute interval includes an audio signal, and wherein the identifying of the occurrence of the channel change event comprises:

based on the audio signals before and after the mute interval being identified to be discontinuous, comparing first fingerprint obtained from an image signal before the mute interval with second fingerprint obtained from an image signal after the mute interval, and based on images before and after the mute interval being identified to be discontinuous according to comparison between the first fingerprint and the second fingerprint, identifying the occurrence of the channel change event.

19. The electronic apparatus of claim 1, wherein the channel change event comprises displaying a black screen on the display.

20. The electronic apparatus of claim 1, wherein the processor is further configured to, obtain time information regarding a black screen in the content, the time information including at least one of information regarding a start time of the black screen, information regarding an end time of the black screen or information regarding a duration of the black screen.

* * * * *